(12) United States Patent
Li et al.

(10) Patent No.: US 10,882,187 B2
(45) Date of Patent: Jan. 5, 2021

(54) METHOD OF PLANNING A CLEANING ROUTE FOR A CLEANING ROBOT AND A CHIP FOR ACHIEVING THE SAME

(71) Applicant: Zhuhai Amicro Semiconductor Co., Ltd., Guangdong (CN)

(72) Inventors: Yongyong Li, Guangdong (CN); Gangjun Xiao, Guangdong (CN); Qinwei Lai, Guangdong (CN)

(*) Notice: Subject to any disclaimer, the term of this patent is extended or adjusted under 35 U.S.C. 154(b) by 381 days.

(21) Appl. No.: 15/979,456

(22) Filed: May 14, 2018

(65) Prior Publication Data
US 2019/0061156 A1 Feb. 28, 2019

(30) Foreign Application Priority Data
Aug. 31, 2017 (CN) ............. 2017 1 0771459

(51) Int. Cl.
*B25J 9/16* (2006.01)
*G05D 1/02* (2020.01)
(Continued)

(52) U.S. Cl.
CPC ............. *B25J 9/1666* (2013.01); *A47L 1/00* (2013.01); *B25J 9/0003* (2013.01); *G05D 1/027* (2013.01); *G05D 1/0219* (2013.01); *G05D 1/0274* (2013.01); *G05D 2201/0203* (2013.01); *G05D 2201/0215* (2013.01)

(58) Field of Classification Search
CPC ............. G05D 1/0274; G05D 1/0219; G05D 2201/0208; G05D 1/0212; G05D 1/0231; G05D 1/0246; G05D 1/0278; G05D 1/028; G05D 2201/0215; G05D 2201/0203; G05D 1/027; G05D 1/0272; A01B 69/008; A47L 2201/06; A47L 2201/04; A47L 9/2852; A47L 1/00; G01S 13/881; G01S 13/89; G01S 15/89; B25J 9/0003; B25J 9/1666; A63H 11/00; G01C 21/206
See application file for complete search history.

(56) References Cited

U.S. PATENT DOCUMENTS 6,809,490 B2 10/2004 Jones
2005/0192707 A1* 9/2005 Park .................. G05D 1/0246
700/259
(Continued)

OTHER PUBLICATIONS

Oh et al., Complete coverage navigation of cleaning robots using triangular-cell-based map, 2004, IEEE, p. 718-726 (Year: 2004).*
(Continued)

*Primary Examiner* — McDieunel Marc
(74) *Attorney, Agent, or Firm* — Prakash Nama; Global IP Services, PLLC

(57) ABSTRACT

A method of planning a cleaning route for a cleaning robot: firstly, starting from an original point based on maps of grids, cleaning grid zones formed by the grids one by one until an entire region is cleaned, and then establishing a map of the entire region; secondly, searching the map of the entire region to find out uncleaned areas missed from cleaning, and then cleaning the uncleaned areas; thirdly, cleaning peripheral areas of the entire region based on the map of the entire region; and lastly, returning to the original point. A chip is also provided which stores procedures for controlling the cleaning robot to implement the method of planning a cleaning route.

25 Claims, 12 Drawing Sheets

(51) Int. Cl.
*B25J 9/00* (2006.01)
*A47L 1/00* (2006.01)

(56) References Cited

U.S. PATENT DOCUMENTS

| | | | | |
|---|---|---|---|---|
| 2007/0293985 | A1* | 12/2007 | Myeong | G05D 1/0246 700/245 |
| 2008/0294338 | A1* | 11/2008 | Doh | G05D 1/0234 701/533 |
| 2016/0165795 | A1* | 6/2016 | Balutis | G05D 1/0088 701/25 |
| 2019/0094870 | A1* | 3/2019 | Afrouzi | G05D 1/0219 |
| 2020/0069134 | A1* | 3/2020 | Ebrahimi Afrouzi | A47L 11/4041 |
| 2020/0225673 | A1* | 7/2020 | Ebrahimi Afrouzi | B25J 9/1697 |

OTHER PUBLICATIONS

Zhao et al., A grid method for robot path recognition based on RFID technology, 2016, IEEE, p. 2181-2185 (Year: 2016).*
Oh et al., Navigation of cleaning robots using triangular-cell map for complete coverage, 2003, IEEE, p. 2006-2011 (Year: 2003).*
Lee et al., A Hierarchical Path Pla n ning of cleaning robot Based on Grid Map, 2013, IEEE, p. 76-77 (Year: 2013).*

* cited by examiner

METHOD OF PLANNING A CLEANING ROUTE FOR A CLEANING ROBOT AND A CHIP FOR ACHIEVING THE SAME

BACKGROUND OF THE INVENTION

The present invention relates to the field of robots, and more specifically relates to a method of planning a cleaning route for a cleaning robot, and a chip for achieving the same.

Technological development is gradually turning more and more families to live in smart homes. People start to rely more and more on smart devices which bring them convenience. For example, smart robotic cleaners are growing more and more popular. Smart floor mopping robots are robots that can automatically perform cleaning tasks free of any human intervention, and are therefore a kind of smart household appliances. Most of the prior art smart floor mopping robots are operated according to conventional randomized algorithms. According to this kind of conventional arbitrary cleaning technology, the smart floor mopping robots have very low efficiency since they perform cleaning tasks without a specific target because a route for cleaning is not planned in advance. Therefore, these robots apparently clean in a random and arbitrary manner.

Simultaneous Localization And Mapping (SLAM) technology or Concurrent Mapping and Localization (CML) technology has been developed. Compared with conventional technology, SLAM technology enables cleaning to be orderly planned and carried out according to a mapped route, so as to significantly enhance cleaning efficiency as well as a coverage percentage of cleaning area by the cleaning robot. There are various SLAM algorithms, which are based on, for example, laser scan and navigation or visual navigation. These two examples have high costs. A low cost solution for navigation based on mapped route available in most cleaning robots nowadays is based on gyroscope. However, it is very difficult for a solution that simply base on gyroscope to provide an accurate mapped route and achieve high efficiency of route mapping and navigation in different complicated terrains.

BRIEF SUMMARY OF THE INVENTION

The present invention has the following technical solution:

A method of planning a cleaning route for a cleaning robot, comprising the following steps:

starting from an original point based on maps of grids, cleaning grid zones formed by the grids one by one until an entire region is generally cleaned, and then establishing a map of the entire region;

searching the map of the entire region to find out uncleaned areas, and then cleaning the uncleaned areas;

cleaning peripheral areas of the entire region based on the map of the entire region;

returning to the original point.

A chip is also provided which stores procedures for controlling the cleaning robot to implement the method of planning a cleaning route as mentioned above.

The present invention cleans a floor surface grid zone by grid zone until an entire region is cleaned, and then establishes a map of the entire region based on information recorded during cleaning. As such, the present invention solves the problem of low efficiency in the prior art robots which have to construct a map first before cleaning. The present invention enables general cleaning to be performed at the same time of constructing a map so as to increase the cleaning efficiency of the cleaning robot. After that, uncleaned areas not cleaned in the previous general cleaning step are searched and found and then subsequently cleaned according to the map of the entire region. As such, there will not be any missing areas not cleaned in the previous general cleaning step, and also, the missing areas can be quickly searched and found through the map of the entire region constructed in the previous general cleaning step so as to achieve higher efficiency of cleaning the missing areas. Lastly, peripheral areas of the entire region are cleaned based on the map of the entire region so that corners and edges are completely cleaned. As such, the cleaning robot has a higher percentage of coverage of the floor to be cleaned and thus ensures good cleaning effect. The above method is a kind of bionic algorithm that simulates human thinking so that the cleaning robot can plan a cleaning route and perform cleaning more intelligently. The present invention increases the cleaning efficiency of the cleaning robot and a coverage percentage of the cleaning areas to ensure good cleaning effect.

DETAILED DESCRIPTION OF THE INVENTION

Embodiments of the present invention will be further described in detail below with reference to the drawings.

A smart floor mopping robot, also known as automatic cleaner or smart vacuum cleaner etc, is a kind of smart household appliances. It cleans a room's floor automatically by being operated at a certain extent via artificial intelligence. Usually, the robot cleans the floor by mopping and vacuum suction. Dust and rubbish on the floor will be swept or sucked into a collection box disposed inside the robot in order to clean the floor. Generally, robots that can perform sweeping, mopping and vacuum cleaning of the floor are collectively known as floor cleaning robots. A floor cleaning robot has a wireless body which usually has a disc shape. The floor cleaning robot is powered by rechargeable batteries and controlled by a remote or a control panel on the robot body. In general, the floor cleaning robot can be preset with a predetermined cleaning time, and recharge its own batteries. Various sensors such as infrared sensor, gyroscope, acceleration sensor and impact sensor are provided on and within the robot body so that the robot can detect its moving distance and angle, its state of operation as well as obstructions on the floor. If the robot hits a wall or other obstructions, it can make a turn automatically and follow different routes according to different settings so as to carry out orderly and planned cleaning of the floor.

Figure 1:
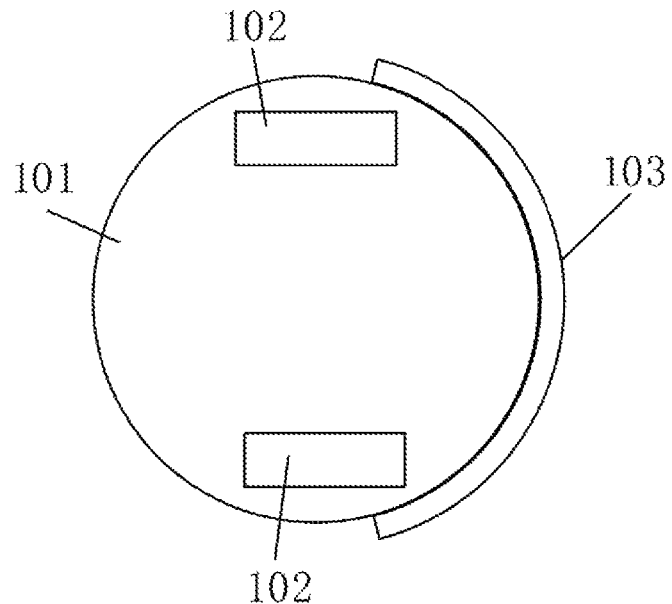
FIG. 1 is a structural view of the cleaning robot according to the present invention.

FIG. 1 shows a cleaning robot comprising a body 101 and drive wheels 102 provided at a bottom part of the body 101. An encoder disk is provided on the drive wheels 102. An impact sensor 103 for impact detection is provided at a front part of the body 101. The impact sensor 103 can be operated by physical contact detection or non-contact detection such as ultrasonic or laser detection. Physical contact detection uses a spring of an internal hardware to allow the cleaning robot to determine if there is an impact with an obstruction based on different I/O levels of its circuit detected according to whether the spring is compressed or released. Contact points with the wall or obstructions relative to a center point of the robot are not fixed, but linear distances between every contact points and the center point of the robot are the same. Contact angles are different based on different contact positions.

Figure 2:
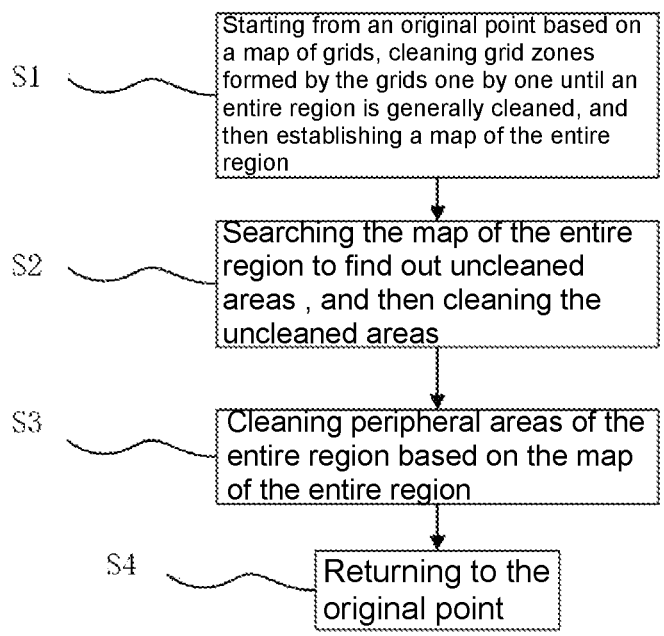
FIG. 2 is a flow chart illustrating a method of planning a cleaning route for the cleaning robot according to the present invention.

FIG. 2 shows a method of planning a cleaning route of the cleaning robot, comprising the following steps:

S1: starting from an original point based on maps of grids, cleaning grid zones formed by grids one by one until an entire region is generally cleaned, and then establishing a map of the entire region;

S2: searching the map of the entire region to find out uncleaned areas not cleaned in step S1, and then cleaning the uncleaned areas;

S3: cleaning peripheral areas of the entire region based on the map of the entire region;

S4: returning to the original point.

The above method provided by the present invention clean a floor surface grid zone by grid zone until an entire region is cleaned, and then establish a map of the entire region based on information recorded during cleaning. As such, the present invention solves the problem of low efficiency in the prior art robots which have to construct a map first before cleaning. The present invention enables general cleaning to be performed at the same time of constructing a map so as to increase the cleaning efficiency of the cleaning robot. After that, uncleaned areas not cleaned in the previous general cleaning step are searched and found and then subsequently cleaned according to the map of the entire region. As such, there will not be any missing areas not cleaned in the previous general cleaning step, and also, the missing areas can be quickly searched and found through the map of the entire region constructed in the previous general cleaning step so as to achieve higher efficiency of cleaning the missing areas. Lastly, peripheral areas of the entire region are cleaned based on the map of the entire region so that corners and edges are completely cleaned. As such, the cleaning robot has a higher percentage of coverage of the floor to be cleaned and thus ensures good cleaning effect. The above method is a kind of bionic algorithm that simulates human thinking so that the cleaning robot can plan a cleaning route and perform cleaning more intelligently. The present invention increases the cleaning efficiency of the cleaning robot and a coverage percentage of the cleaning areas to ensure good cleaning effect.

Preferably, starting from an original point in said step S1 is specified as follows: If the original point is where a recharge station is positioned, the cleaning robot leaves the recharge station and turns by 180 degree and then moves forward linearly. If the original point is not where the recharge station is positioned but somewhere else, the cleaning robot can directly move forward linearly; since the cleaning robot has to perform general cleaning grid zone by grid zone, an original point has to be determined first, and then a coordinate system is built based on the original point, and after that a map of grids consisting of multiple grids is formed on the coordinate system, and grid zones are defined according to the maps of grids. Grid zones which are the same have a same number of grids arranged in a same way for each grid zone. Different positions can be defined as the original point according to practical situations, which usually consist of two situations: The first situation is when the cleaning robot is recharging on the recharge station, it leaves the recharge station when it receives a command to start cleaning; when the cleaning robot leaves the recharge station, a front part of the cleaning robot faces towards the recharge station, therefore the cleaning robot has to turn by 180 degrees first and then move forward linearly to start cleaning based on the recharge station behind that acts as the original point, otherwise the cleaning robot will return to the recharge station directly if it moves forward to start cleaning without first turning 180 degrees. The second situation is when the cleaning robot is not at the recharge station but at somewhere else, in this case the cleaning robot will treat its current position as the original point when it receives a command to start cleaning, and will therefore move forward linearly from that current position to start cleaning; as such, it is not necessary to spend extra time to return to a particular original point, thereby increasing the cleaning efficiency of the cleaning robot. Since an original point is not a fixed point, the maps of grids constructed based on different original points are different, but it is beneficial in that the cleaning robot can therefore be more flexibly operated such that its moves are performed more intelligently, thereby enhancing the bionic effect of the product.

Preferably, the step of cleaning the grid zones formed by the grids one by one as recited in step S1 specifically comprises the following steps: starting from the original point, moving forward linearly along a first direction; cleaning a first grid zone on one side along the first direction, and then cleaning other adjacent grid zones of the same row one by one; returning to a second grid zone adjacent to the first grid zone along the same column, and then cleaning the second grid zone and also other adjacent grid zones of the same row one by one; repeating such cleaning processes until all grid zones of the same column of the first grid zone along the first direction as well as all adjacent grid zones along the same row of each of these grid zones along the same column of the first grid zone are cleaned; returning to the original point; starting from the original point, moving forward linearly along the first direction; cleaning a third grid zone on another side along the first direction, and then cleaning other adjacent grid zones of the same row one by one; returning to a fourth grid zone adjacent to the third grid zone along the same column, and then cleaning the fourth grid zone and also other adjacent grid zones of the same row on by one; repeating such cleaning processes until all grid zones of the same column of the third grid zone along the first direction as well as all adjacent grid zones along the same row of each of these grid zones along the same column of the third grid zone are cleaned.

Figure 3:
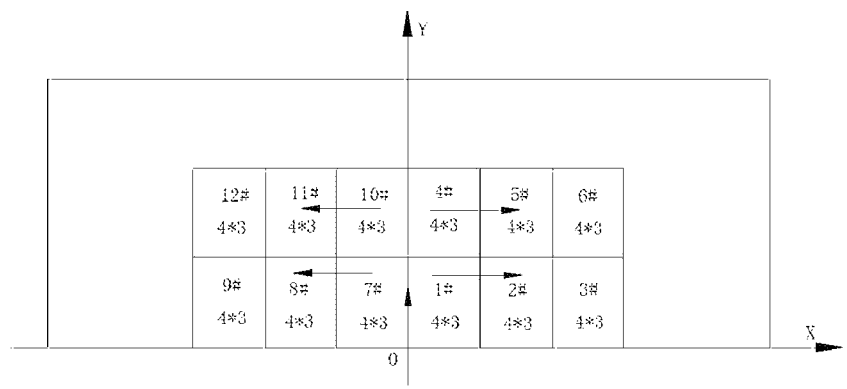
FIG. 3 is an illustration showing a first embodiment of how grid zones are cleaned one by one according to the present invention.

As shown in FIG. 3, a grid zone is a rectangular zone having a predetermined length of 4 m and a predetermined width of 3 m. The predetermined length and the predetermined width may be different according to different practical needs. Also, the predetermined length and the predetermined width can have a same value.

As shown in FIG. 3, the cleaning robot starts to clean at the original point O and move forward linearly according to a positive direction along a Y axis (i.e. the first direction). The robot cleans, from left to right, a 1# grid zone (i.e. the first grid zone) on a right side of the Y axis and then a 2# grid zone and a 3# grid zone adjacent to the 1# grid zone along the same row according to a zig-zag route having a curved bend at each turn. Then the cleaning robot returns to a 4# grid zone (i.e. the second grid zone) along the same column of the 1# grid zone and then cleans the 4# grid zone, a 5# grid zone and a 6# grid zone in the same manner. If there are still other grid zones along the same column of the 1# grid zone, repeat the above cleaning processes until all the grid zones on the right side along the positive direction of the Y axis are cleaned. The cleaning robot then returns to the original point O. Next, the cleaning robot moves forward linearly again according to the positive direction along the Y axis and then cleans, from right to left, a 7# grid zone (i.e. the third grid zone) on a left side of the Y axis and then a 8# grid zone and a 9# grid zone adjacent to the 7# grid zone along the same row according to a zig-zag route having a curved bend at each turn. Then the cleaning robot returns to a 10# grid zone (i.e. the fourth grid zone) along the same column of the 7# grid zone and then cleans the 10# grid zone, an 11# grid zone and a 12# grid zone in the same manner. If there are still other grid zones along the same column of the 7# grid zone, repeat the above cleaning processes until all the grid zones on the left side along the positive direction of the Y axis are cleaned.

When the cleaning robot is moving, the cleaning robot may be deviated from its planned route owing to reasons like hitting against obstructions or wheel slippage. If the cleaning robot moves too far away from the original point, the cleaning robot may not be able to accurately return to the original point, and hence resulting in skipped cleaning or repeated cleaning when the cleaning robot continues to clean. Therefore, the cleaning robot of the present invention cleans one side first and then the other side, specifically, the cleaning robot cleans the grid zones on one side of the Y axis first, and then returns to the original point for corrective adjustment of its position before starting to clean the grid zones on the other side of the Y axis. As such, the cleaning robot will not move too far away from the original point which results in inaccurate return to the original point due to significant deviation from the planned route. As such, the present invention prevents the problem of skipped cleaning or repeated cleaning.

Preferably, the step of cleaning the grid zones formed by the grids one by one as recited in step S1 specifically comprises the following steps: starting from the original point, moving forward linearly along a first direction; cleaning a first grid zone on one side along the first direction, and then cleaning other adjacent grid zones of the same row one by one; returning to the original point; starting from the original point, moving forward linearly along a second direction opposite to the said first direction, cleaning a third grid zone which is on the same side and along the same column as the first grid zone, and then cleaning other adjacent grid zones of the same row one by one; returning to the original point; starting from the original point, moving forward linearly along the first direction; cleaning a second grid zone on another side along the first direction, and then cleaning other adjacent grid zones of the same row one by one; returning to the original point; starting from the original point, moving forward linearly along the second direction opposite to the first direction, cleaning a fourth grid zone which is on the same side and along the same column as the second grid zone, and then cleaning other adjacent grid zones of the same row one by one.

Figure 4:
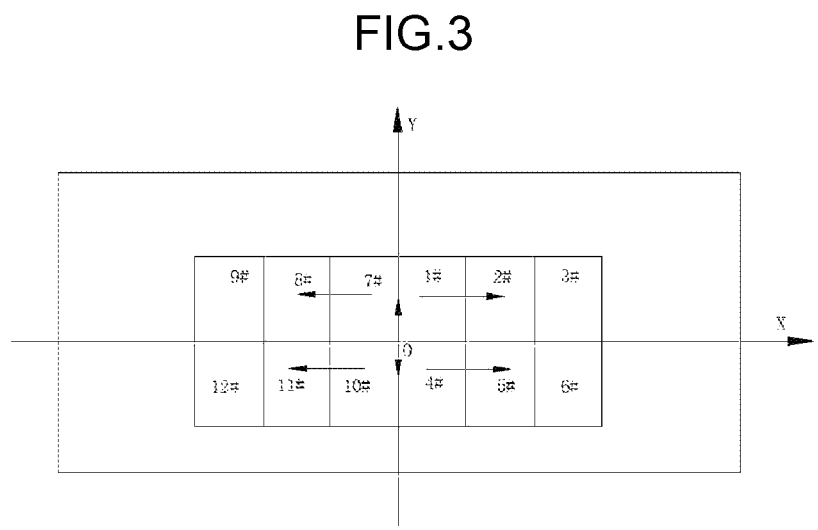
FIG. 4 is an illustration showing a second embodiment of how grid zones are cleaned one by one according to the present invention.

As shown in FIG. 4, an example is illustrated by using grid zones also having lengths of 4 m and widths of 3 m. The cleaning robot starts to clean at the original point O and move forward linearly according to a positive direction along a Y axis (i.e. the first direction). The robot cleans, from left to right, a 1# grid zone (i.e. the first grid zone) on a right side of the Y axis and then a 2# grid zone and a 3# grid zone adjacent to the 1# grid zone along the same row according to a zig-zag route having a curved bend at each turn. If there are still other grid zones along the same column of the 1# grid zone along the positive direction of the Y axis, repeat the above cleaning processes to clean all grid zones in the same column as the 1# grid zone along the positive direction of the Y axis as well as adjacent grid zones of each of these grid zones in the same column as the 1# grid zone along the positive direction of the Y axis until all the grid zones on the right side along the positive direction of the Y axis are cleaned. The cleaning robot then returns to the original point O. Next, the cleaning robot starts to clean at the original point O and move forward linearly according to a negative direction along a Y axis (i.e. the second direction). The robot cleans, from left to right, a 4# grid zone (i.e. the third grid zone) on a right side of the Y axis and then a 5# grid zone and a 6# grid zone adjacent to the 4# grid zone along the same row according to a zig-zag route having a curved bend at each turn. If there are still other grid zones along the same column of the 4# grid zone along the negative direction of the Y axis, repeat the above cleaning processes to clean all grid zones in the same column as the 4# grid zone along the negative direction of the Y axis as well as adjacent grid zones of each of these grid zones in the same column as the 4# grid zone along the negative direction of the Y axis until all the grid zones on the right side along the negative direction of the Y axis are cleaned. The cleaning robot then returns to the original point O. The cleaning robot starts to clean at the original point O and move forward linearly according to the positive direction along the Y axis (i.e. the first direction). The robot cleans, from right to left, a 7# grid zone (i.e. the second grid zone) on a left side of the Y axis and then a 8# grid zone and a 9# grid zone adjacent to the 7# grid zone along the same row according to a zig-zag route having a curved bend at each turn. If there are still other grid zones along the same column of the 7# grid zone along the positive direction of the Y axis, repeat the above cleaning processes to clean all grid zones in the same column as the 7# grid zone along the positive direction of the Y axis as well as adjacent grid zones of each of these grid zones in the same column as the 7# grid zone along the positive direction of the Y axis until all the grid zones on the left side along the positive direction of the Y axis are cleaned. The cleaning robot then returns to the original point O. Next, the cleaning robot starts to clean at the original point O and move forward linearly according to a negative direction along the Y axis (i.e. the second direction). The robot cleans, from right to left, a 10# grid zone (i.e. the fourth grid zone) on a left side of the Y axis and then an 11# grid zone and a 12# grid zone adjacent to the 10# grid zone along the same row according to a zig-zag route having a curved bend at each turn. If there are still other grid zones along the same column of the 10# grid zone along the negative direction of the Y axis, repeat the above cleaning processes to clean all grid zones in the same column as the 10# grid zone along the negative direction of the Y axis as well as adjacent grid zones of each of these grid zones in the same column as the 10# grid zone along the negative direction of the Y axis until all the grid zones on the left side along the negative direction of the Y axis are cleaned. The cleaning robot then returns to the original point O.

When the cleaning robot is moving, the cleaning robot may be deviated from its planned route owing to reasons like hitting against obstructions or wheel slippage. If the cleaning robot moves too far away from the original point, the cleaning robot may not be able to accurately return to the original point, and hence resulting in skipped cleaning or repeated cleaning when the cleaning robot continues to clean. Therefore, the original point is set at a center position of the maps of grids, and the cleaning robot cleans the upper right, lower right, upper left and lower left portions relative to the original point, so that distances of the grid zones in each of the portions relative to the original point are more even and will not be too far away from the original point. After a portion is cleaned, the cleaning robot returns to the original point for corrective adjustment of its position before cleaning the grid zones of another portion. As such, the cleaning robot will not move too far away from the original point which results in inaccurate return to the original point due to significant deviation from the planned route. As such, the present invention prevents the problem of skipped cleaning or repeated cleaning.

Preferably, in each of the embodiments shown in FIGS. 3 and 4, there are N grid zones in each row, wherein N is a natural number bigger than 1 and smaller than 10. Due to various reasons as discussed above, the cleaning robot will be deviated from its planned route when moving. If the cleaning robot moves too far away, the deviation may be too great that the cleaning robot may not be possible to accurately return back to the original point. Therefore, a preferred design limits the number of grid zones in each row within 1 to 10 such that the cleaning robot can accurately return back to the original point while maximizing the area to be cleaned.

In the prior art, a cleaning robot follows a zig-zag route to clean the grid zones. A zig-zag route described here particularly means the cleaning robot moves forward linearly in a first direction up to a first turning point where it turns 90 degrees and moves forward by a certain distance, and after that the cleaning robot turns 90 degrees again and moves forward linearly in a second direction opposite to the first direction up to a second turning point where it turns 90 degrees and moves forward by a certain distance and then turns 90 degrees again and repeats the movements from the start, thus forming a zig-zag route. A turning point (first turning point, second turning point etc) as mentioned is a point when the cleaning robot reaches a peripheral edge of a grid zone or when an obstruction that requires a turn, such as a wall, is detected. Since each turning of the cleaning robot as described above requires two stops and two right-angled turns, every turn of the cleaning robot is interrupted and not smooth, thereby lowering the mobility of the cleaning robot.

A modified solution of a zig-zag route with a curved bend at each turn for cleaning the grid zones is provided by the present invention. Preferably, the cleaning robot follows the modified zig-zag route with a curved bend at each turn according to the following moving steps: moving along a first direction on a first linear path up to a first turning point, turning from the first turning point and moving to a starting point of an adjacent second linear path along a curved path, moving along the second linear path along a second direction opposite to the first direction up to a second turning point, turning from the second turning point and moving to a starting point of an adjacent third linear path along a curved path, moving along the third linear path along the first direction up to a third turning point, turning from the third turning point and moving to a starting point of an adjacent fourth linear path along a curved path, moving along the fourth linear path along the second direction opposite to the first direction up to a fourth turning point, and so and so forth, wherein liner paths are parallel to each other and are spaced apart by a same interval of a predetermined width.

Figure 5:
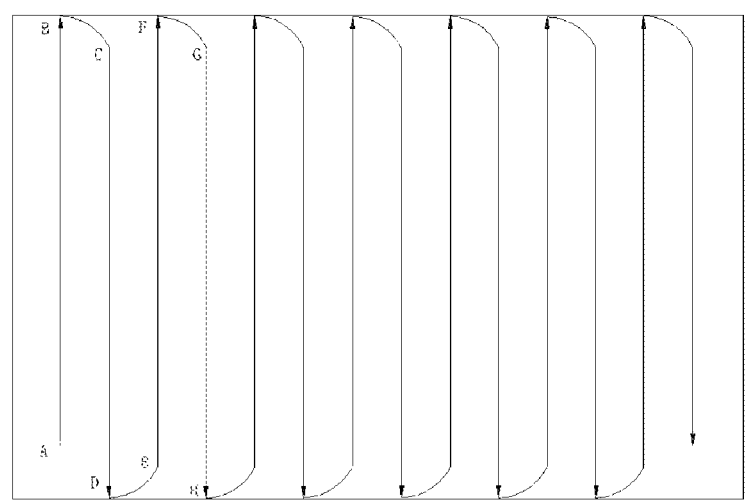
FIG. 5 is a schematic view showing a zig-zag cleaning route having a curved bend at each turn.

As shown in FIG. 5, the cleaning robot follows the route according to the arrows. A large rectangle formed by the four outermost sides represents a perimeter of a grid zone. A starting point A is a point which the cleaning robot starts to move; the cleaning robot moves on a first linear path represented by a straight line AB, wherein an arrow shown on the straight line AB points at a first direction; when the cleaning robot reaches a turning point B, the cleaning robot turns from the turning point B and moves to a point C along a curved path; when the cleaning robot reaches the point C, the cleaning robot will move along a second direction which is opposite to the first direction according to which the cleaning robot moved on the first linear path; the cleaning robot then moves along a second linear path represented by a straight line CD along the second direction opposite to the first direction, with the point C being a starting point of the second linear path and a point D being a turning point of the second linear path. As shown in FIG. 5, straight lines bearing arrows represent linear paths on which the cleaning robot move; curved bends with their respective front ends and rear ends connecting to respective linear paths represent turning paths of the cleaning robot. As shown in the figure, straight line EF is a third linear path, straight line GH adjacent to the straight line EF at its right side is a fourth linear path, and so and so forth.

The cleaning robot follows the zig-zag route with a curved bend at each turn according to the following moving steps: moving along a first direction on a first linear path AB up to a first turning point B, turning from the first turning point B and moving to a starting point C of an adjacent second linear path CD along a curved path, moving along the second linear path CD along a second direction opposite to the first direction up to a second turning point D, turning from the second turning point D and moving to a starting point E of an adjacent third linear path EF along a curved path, moving along the third linear path EF along the first direction up to a third turning point F, turning from the third turning point F and moving to a starting point G of an adjacent fourth linear path GH along a curved path, moving along the fourth linear path GH along the second direction opposite to the first direction up to a fourth turning point H, and so and so forth, wherein liner paths are parallel to one another and are spaced apart by a same interval of a predetermined width. The predetermined width is determined according to practical situation. In the present embodiment, the predetermined width is the width of the body of the cleaning robot, so that when the cleaning robot is moving along the zig-zag route with a curved bend at each turn, areas between two adjacent linear paths will be cleaned once and thoroughly by the cleaning robot. Therefore, missed cleaning or repeated cleaning will not occur between two adjacent linear paths, thereby enhancing the cleaning efficiency.

According to the zig-zag route with a curved bend at each turn as described above, the cleaning robot makes a turn between two adjacent linear paths by following a curved path that enables smooth turning of the cleaning robot, thereby enhancing the smoothness and stability of the cleaning robot during turning, and hence avoiding the interruption and lack of smoothness in the prior art which only enables right-angled turns. Therefore, the present invention greatly increases the mobility of the cleaning robot.

Figure 6:
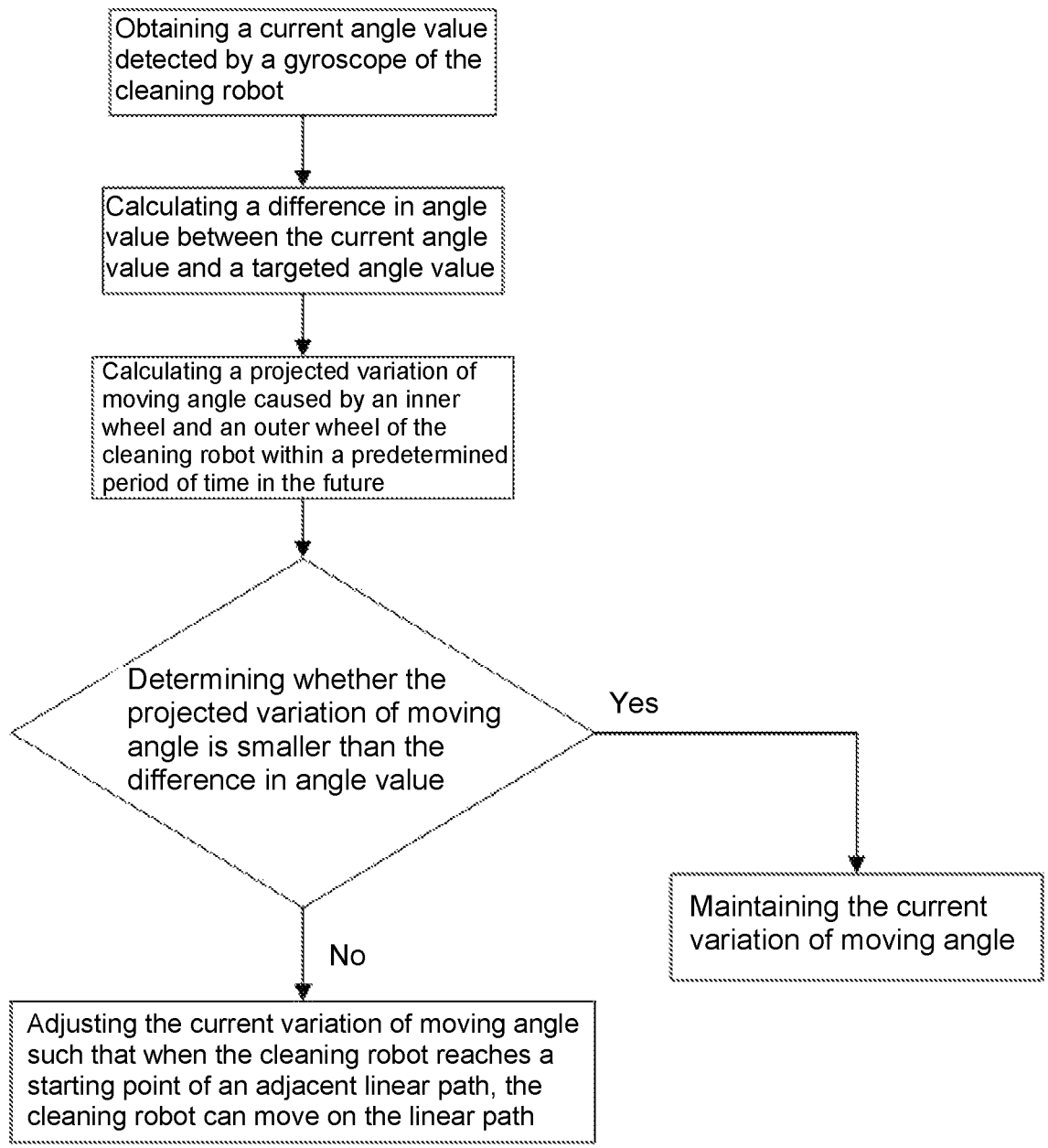
FIG. 6 is a flow chart of how the cleaning robot moves along each curved bend at each turn of the zig-zag cleaning route according to the present invention.

As shown in FIG. 6, turning along a curved path comprises the following steps: obtaining a current angle value detected by a gyroscope of the cleaning robot; calculating a difference in angle value between the current angle value and a targeted angle value; calculating a projected variation of moving angle caused by an inner wheel and an outer wheel of the cleaning robot within a predetermined period of time in the future; determining whether the projected variation of moving angle is smaller than the difference in angle value, if yes, maintaining the current variation of moving angle, if no, adjusting the current variation of moving angle such that when the cleaning robot reaches a starting point of an adjacent linear path, the cleaning robot can move on the linear path. By predicting a projected variation of moving angle of the cleaning robot within a predetermined period of time in the future, it can be determined in advance whether the cleaning robot will make an excessive turn. If the projected variation of moving angle is greater than or equal to the difference in angle value, the cleaning robot will make an excessive turn and hence deviate from the planned curved path; adjustment is therefore immediately required to adjust the current variation of moving angle. If the projected variation of moving angle is smaller than the difference in angle value, maintain the current variation of moving angle and continue to allow the cleaning robot to move smoothly on the current curved path.

An inner wheel refers to the drive wheel which moves slower when the cleaning robot makes a turn along the curved path. For example, when the cleaning robot turns left, the drive wheel 102 on the left side is considered the inner wheel; when the cleaning robot turns right, the drive wheel 102 on the right side is considered the inner wheel. The outer wheel refers to the drive wheel which moves faster when the cleaning robot makes a turn along the curved path. For example, when the cleaning robot turns left, the drive wheel on the right side is considered the outer wheel; when the cleaning robot turns right, the drive wheel 102 on the left side is considered the outer wheel.

Figure 7:
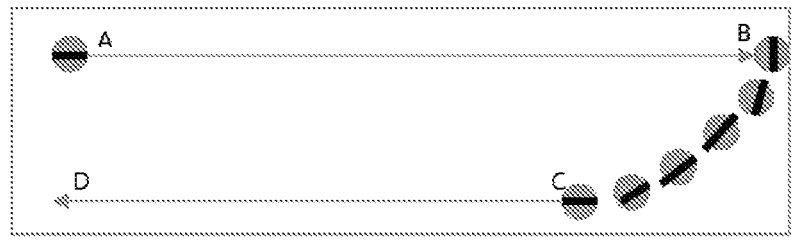
FIG. 7 is shows a route of the cleaning robot moving along a curved bend at a turn of the zig-zag cleaning route according to the present invention.

The targeted angle value is an angle value when the cleaning robot reaches a starting point of a linear path. Take FIG. 7 as an example, the cleaning robot is represented by circles each having a black strip in the middle, and a reference direction is a direction indicated by an arrow on the straight line AB. When the cleaning robot reaches the point B, the cleaning robot turns from the reference direction by 90 degrees; therefore a current angle value detected by the gyroscope is 90 degrees. Since the point C is a target point, an angle value of the cleaning robot at the point C is the targeted angle value. The targeted angle value is 180 degrees, which represents a direction opposite to the reference direction. Therefore, a difference in angle value between the current angle value and the targeted angle value is 90 degrees. As the cleaning robot gradually approaches the point C from the point B, the current angle value detected will gradually increase and the difference in angle value will gradually decrease. When the cleaning robot reaches the point C, the difference in angle value should be zero.

Preferably, the projected variation of moving angle caused by an inner wheel and an outer wheel of the cleaning robot within a predetermined period of time in the future is calculated according to the following steps: obtaining a current moving speed of the inner wheel; obtaining a current moving speed of the outer wheel; calculating an absolute value of a difference in speed between the current moving speed of the inner wheel and the current moving speed of the outer wheel; calculating a projected difference in moving distance between the inner wheel and the outer wheel within the predetermined period of time in the future, wherein said projected difference in moving distance is a product of the absolute value of the difference in speed times the predetermined period of time in the future; calculating the projected variation of moving angle by dividing the projected difference in moving distance by a width between the inner wheel and the outer wheel.

For example, when the current moving speed of the inner wheel is V1, and the current moving speed of the outer wheel is V2, the absolute value of difference in speed between the current moving speed of the inner wheel and the current moving speed of the outer wheel is $\Delta V$, $\Delta V=|V1-V2|$. Set $\Delta T$ being the predetermined period of time in the future; the projected difference in moving distance between the inner wheel and the outer wheel within $\Delta T$ is $\Delta L$, $\Delta L=\Delta V*\Delta T$. Set W being the width between the inner wheel and the outer wheel; based on minor angle measurement method, the projected variation of moving angle is $\Delta\theta=\Delta L/W$.

$\Delta T$ is a value which can be predetermined, and a different value can be set based on different turning conditions. Preferably, $\Delta T$ can be 50 millisecond, 100 millisecond or 200 millisecond etc. The time period as set should provide sufficient time for adjustment when the cleaning robot receives a projected result that prompts a corresponding adjustment to be made.

The width W between the inner wheel and the outer wheel is a linear distance between the two drive wheels 102 of the cleaning robot shown in FIG. 1.

Preferably, the current variation of moving angle is a ratio between the difference in moving distance between the inner wheel and the outer wheel to the width between the inner wheel and the outer wheel within a unit time, wherein the difference in moving distance between the inner wheel and the outer wheel is a product of the absolute value of difference in speed between the current moving speed of the inner wheel and the current moving speed of the outer wheel times the unit time.

For example, when the current moving speed of the inner wheel is V1, and the current moving speed of the outer wheel is V2, the absolute value of difference in speed is ΔV, ΔV=|V1−V2|. If a unit time is set as T, the difference in moving distance between the inner wheel and the outer wheel is ΔL, ΔL=ΔV*T within T. Set W as the width between the inner wheel and the outer wheel, the current variation of moving angle is Δθ=ΔL/W according to minor angle measurement method.

T is also a value which can be predetermined, and a different value can be set based on different practical situations. Preferably, T can be 10 millisecond or 20 millisecond. ΔT must be set as 5 times, 10 times or 20 times of the unit time, so that sufficient time for adjustment can be provided when the cleaning robot receives a projected result that prompts a corresponding adjustment to be made.

The width W between the inner wheel and the outer wheel is a linear distance between the two drive wheels 102 of the cleaning robot shown in FIG. 1.

Figure 8:
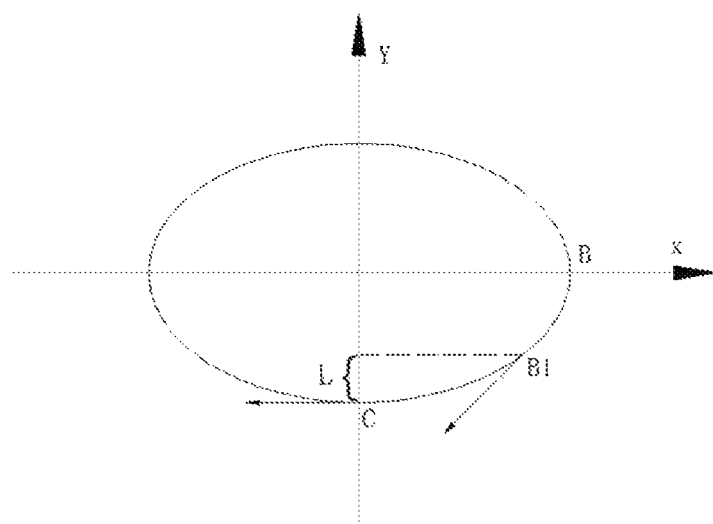
FIG. 8 is an analytical view of the route of the cleaning robot moving along a curved bend at a turn of the zig-zag cleaning route according to the present invention.

Preferably, as shown in FIG. 8, the current variation of moving angle is adjusted according to the following steps: obtaining a linear distance L between a currently position B1 and a starting point C along a widthwise direction of a linear path; calculating a distance ratio of the linear distance L to a predetermined width; adjusting a moving speed of the inner wheel according to the distance ratio so that the moving speed of the inner wheel is equal to a current moving speed of the inner wheel times the distance ratio times a constant. When the cleaning robot is approaching the starting point C, the difference in angle value will become smaller and the variation of moving angle required will become smaller; Therefore, the speed of the inner wheel has to be adjusted such that the speed of the inner wheel gradually increases to reduce the difference in speed between the speed of the inner wheel and the speed of the outer wheel; as such, the variation of moving angle will gradually become smaller and will be zero when the cleaning robot reaches the target point (i.e. the starting point C); from the starting point C, the cleaning robot can follow a linear path starting at the starting point C to move forward linearly. When the speed of the inner wheel is adjusted according to the distance ratio, the speed of the inner wheel is limited so that the speed of the inner wheel is smaller than or equal to the speed of the outer wheel. Accordingly, the present invention can ensure that the cleaning robot will not deviate from the curved path when turning, thereby smoothly moving along the curved path.

Due to factors like different structures of different cleaning robots and different terrains, a subsequently adjusted variation of moving angle may not be the same even if the same parameters for changes are input for adjusting the variation of moving angle. Therefore, a constant is required to be introduced for compensation. The constant is obtained through tests and experiments carried out under a basket of factors like specific type of cleaning robot being used and environmental conditions for tests and experiments. By using the constant, an accurate data can be obtained while adjusting the variation of moving angle, thereby avoiding errors in controlling the cleaning robot.

Preferably, said widthwise direction of a linear path refers to a longitudinal direction of a straight line passing through adjacent linear paths perpendicularly. In other words, the widthwise direction in FIG. 8 means a direction along Y axis. The predetermined width is a linear distance of a straight line between and perpendicular to both of the adjacent linear paths. In other words, the predetermined width in FIG. 8 means a linear distance between an origin of the coordinate system and the starting point C.

Preferably, the current moving speed of the inner wheel or the current moving speed of the outer wheel is obtained according to the following steps: obtaining a number of pulses received by the encoder disk within a unit time in order to obtain an encoder disk specific value; calculating a ratio of the encoder disk specific value to a circumference of the inner wheel or the outer wheel in order to obtain a pulse interval specific value; calculating a ratio of the number of pulses received by the encoder disk within the unit time to the pulse interval specific value to obtain a distance moved by the inner wheel or the outer wheel within the unit time (i.e. the moving speed of the inner wheel or the outer wheel). The said encoder disk specific value is a number of pulse counted per rotation of the inner wheel or the outer wheel. The circumference of the inner wheel or the outer wheel is a diameter of the inner wheel or the outer wheel times the circumference ratio π. The unit time is also a predetermined value preset according to different situations. The unit time can be 1 millisecond, 10 millisecond or 100 millisecond etc.

An algorithm of the curved path of the present invention is based on an elliptical model as shown in FIG. 8. As shown in FIG. 8, turning movement of the cleaning robot follows partially an outline of an ellipse. Starting from the point B positioned on a positive direction of X axis, the cleaning robot moves to the point C positioned on a negative direction of Y axis. The point B is a turning point of a first linear path, and its distance from the origin of the coordinate system is predetermined. Likewise, an angle of turning to the starting point C (i.e. the target point) of a next linear path is also predetermined. Therefore, when the cleaning robot moves along the curved path, the speeds of the drive wheels of the cleaning robot can be controlled so that the cleaning robot can move along the planned curved path. The speeds of the two drive wheels can be correlated by a linear scale. The initial default setting is that the speed of the outer wheel is 7 times the speed of the inner wheel. Detections are made throughout the entire journey of the cleaning robot along the curved path such that the speed of the inner wheel can be adjusted to change the variation of moving angle of the cleaning robot whenever an adjustment criterion is met.

It is very common for the cleaning robot to encounter obstructions like a fan, a wall or a table leg during cleaning. Handling obstructions is a very important task for the cleaning robot because it directly affects cleaning efficiency. There are two ways of handling obstructions in the prior art, namely bypassing the obstructions or turning back against the obstructions. Bypassing an obstruction cannot ensure that there are areas to be cleaned after bypassing the obstruction. Turning back from an obstruction may miss a large area that requires cleaning on another side of the obstruction. Therefore, these two ways of handling obstructions are not smart enough, and hence resulting in low cleaning efficiency that users are not satisfied with. Accordingly, the present invention provides a method of handling obstructions when obstructions are detected during cleaning. The method provided by the present invention can effectively solve the problem of low efficiency cleaning.

Figure 9:
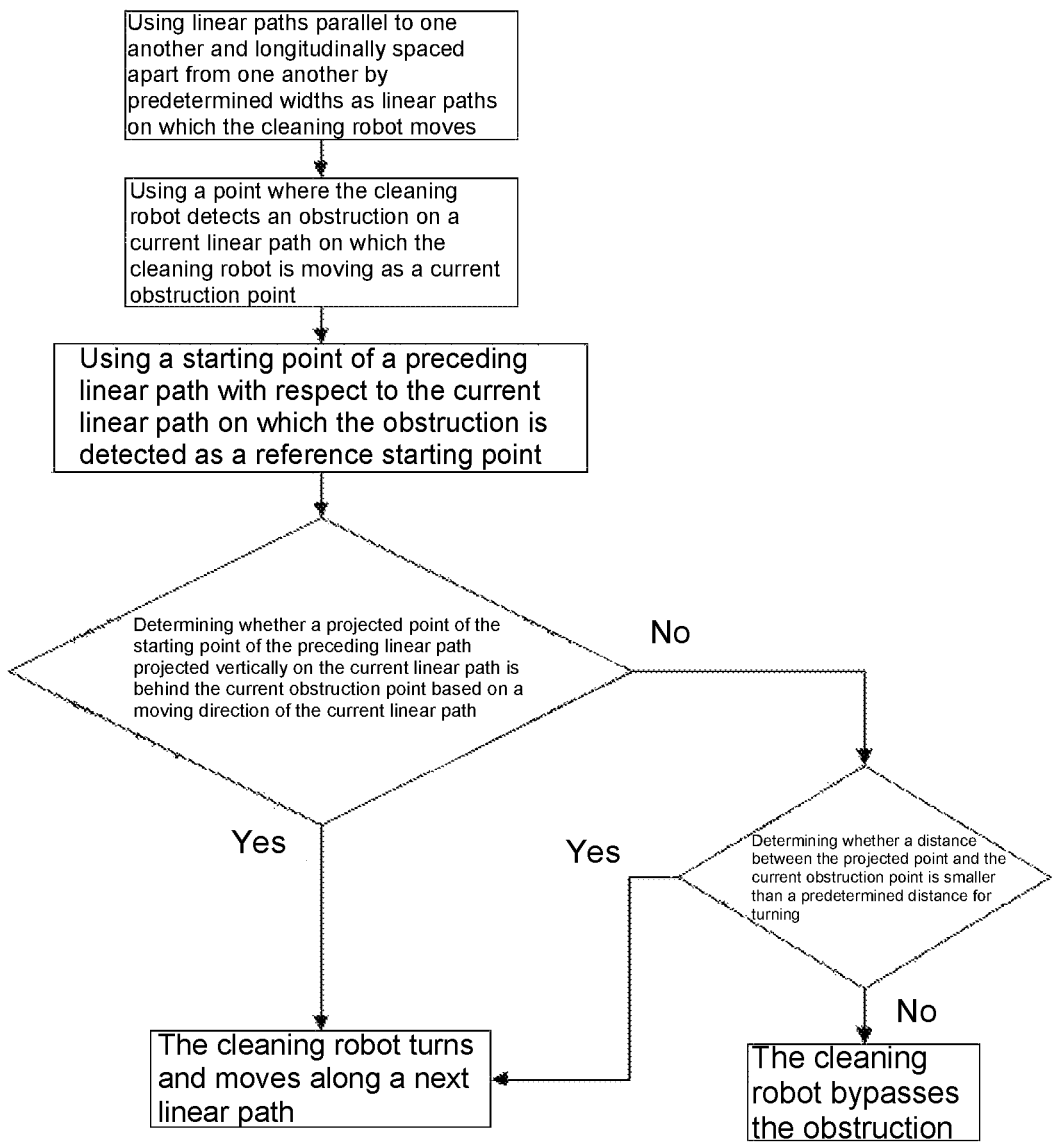
FIG. 9 is a flow chart of handling obstructions detected during cleaning according to the present invention.

Preferably, as shown in FIG. 9, when obstructions are detected when cleaning is carried out grid zone by grid zone, a method of handling obstructions is provided, comprising the following steps: using linear paths parallel to one another and longitudinally spaced apart from one another by predetermined width as linear paths on which the cleaning robot moves, wherein the cleaning robot moves towards opposite directions on each pair of adjacent linear paths; using a point where the cleaning robot detects an obstruction on a current linear path on which the cleaning robot is moving as a current obstruction point; using a starting point of a preceding linear path with respect to the current linear path on which the obstruction is detected as a reference starting point; determining whether a projected point of the starting point of the preceding linear path projected vertically on the current linear path is behind the current obstruction point based on a moving direction of the current linear path; if yes, the cleaning robot turns and moves along a next linear path, if no, determining whether a distance between the projected point and the current obstruction point is smaller than a predetermined distance for turning, and if yes, the cleaning robot turns and moves along a next linear path, and if no, the cleaning robot bypasses the obstruction.

In FIGS. 10-17, small circles represent various positions along the route on which the cleaning robot is moving. Lines bearing arrows show how the cleaning robot is moving along the route. The largest rectangle formed by four outermost lines represents a perimeter of a grid zone.

Figure 10:
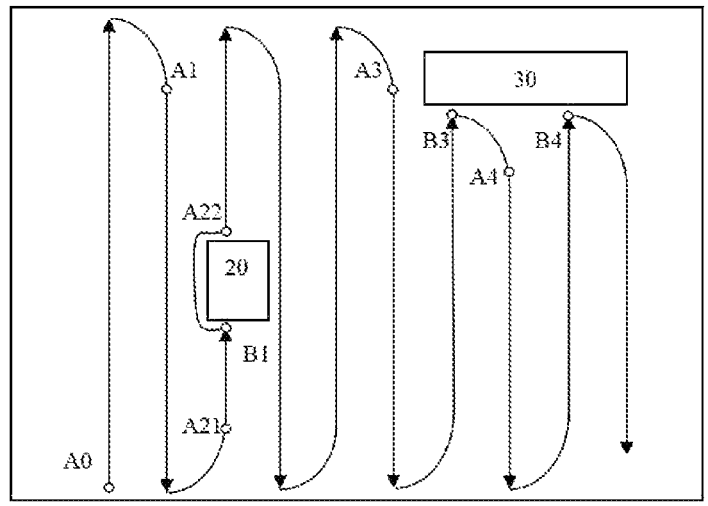
FIG. 10 is a first embodiment of the route of the cleaning robot when obstructions are detected during cleaning.

As shown in FIG. 10, the starting point A0 is a point where the cleaning robot starts to move. The straight line bearing an arrow on which A0 is positioned is a first linear path on which the cleaning robot is moving. When the cleaning robot reaches a turning point where it turns and moves according to a curved path to the point A1, the cleaning robot when positioned at the point A1 will have a moving direction opposite to the first linear path, and this linear path having an opposite moving direction compared with the first linear path is a second linear path of the cleaning robot. The point A1 is a starting point of the second linear path. As shown in FIG. 10, vertical straight lines bearing arrows are linear paths on which the cleaning robot is moving. Curved paths each having two ends connecting to two adjacent linear paths respectively are turning paths of the cleaning robot. A linear path where the point A21 and the point A22 are positioned is a third linear path, and a next linear path adjacent to a right side of the third linear path is a fourth linear path, and so on and so forth.

As shown in FIG. 10, when obstructions are detected when cleaning is carried out grid zone by grid zone, a method of handling obstructions is provided, comprising the following steps: using linear paths parallel to one another and longitudinally spaced apart from one another by predetermined widths as linear paths on which the cleaning robot moves, wherein the cleaning robot moves towards opposite directions on each pair of adjacent linear paths; using a point B1 where the cleaning robot detects an obstruction 20 on a current linear path (i.e. the third linear path) on which the cleaning robot is moving as a current obstruction point; using a starting point A1 of a preceding linear path (i.e. the second linear path) with respect to the current linear path on which the obstruction is detected as a reference starting point; it is determined that a projected point of the starting point A1 of the preceding linear path (i.e. the second linear path) projected vertically on the current linear path (i.e. the third linear path) is in front of the current obstruction point B1 based on a moving direction of the current linear path (i.e. the third linear path) (which indicate that in general circumstances, there are areas that have to be cleaned in front of the obstruction); it is also further determined that a distance between the projected point and the current obstruction point is greater than a predetermined distance for turning (which indicate that in general circumstances, the area to be cleaned in front of the obstruction is large enough to allow the cleaning robot to go there to perform cleaning). Therefore, the cleaning robot bypasses the obstruction 20. After the cleaning robot bypasses the obstruction 20, the cleaning robot reverts back to the third linear path and continues to move along the third linear path.

When the cleaning robot moves to the seventh linear path, the cleaning robot detects an obstruction 30 at the point B3. Therefore, the point B3 is a current obstruction point. Use a starting point A3 of a preceding linear path (i.e. the sixth linear path) with respect to the current linear path on which the obstruction is detected as a reference starting point; it is determined that a projected point of the starting point A3 of the preceding linear path (i.e. the sixth linear path) projected vertically on the current linear path (i.e. the seventh linear path) is in front of the current obstruction point B3 based on a moving direction of the current linear path (i.e. the seventh linear path); it is also further determined that a distance between the projected point and the current obstruction point is smaller than a predetermined distance for turning (which indicate that in general circumstances, the area to be cleaned in front of the obstruction is not large enough to allow the cleaning robot to go there to perform cleaning). Therefore, the cleaning robot turns back and moves along a next linear path (i.e. the eighth linear path).

When the cleaning robot moves to the ninth linear path, the cleaning robot detects an obstruction 30 at the point B4. Therefore, the point B4 is a current obstruction point. Use a starting point A4 of a preceding linear path (i.e. the eighth linear path) with respect to the current linear path on which the obstruction is detected as a reference starting point; it is determined that a projected point of the starting point A4 of the preceding linear path (i.e. the eighth linear path) projected vertically on the current linear path (i.e. the ninth linear path) is behind the current obstruction point B4 based on a moving direction of the current linear path (i.e. the ninth linear path) (which indicate that there may not exist any area that has to be cleaned in front of the obstruction point). To increase cleaning efficiency and avoid purposeless moving, the cleaning robot turns back and moves along a next linear path (i.e. the tenth linear path).

In the above handling method, the cleaning robot determines a next move by determining the relationship with respect to the positions and distances between the current obstruction point and the projected point of the reference starting point, so that the cleaning robot will turn back immediately to clean a more spacious area if it is determined that the space in front of the obstruction is not enough; it is therefore not necessary for the cleaning robot to waste time to move and check the areas in front of the obstruction. When the space in front of the obstruction is enough, the cleaning robot will bypass the obstruction and clean the area in front of the obstruction so as to avoid lowered cleaning efficiency by leaving a spacious area uncleaned. By using the above described method, the cleaning robot can operate more intelligently so that its cleaning efficiency is greatly enhanced.

Preferably, bypassing the obstructions comprises moving along a first edge of the obstruction and then reverting back to the current linear path to continue moving on the current linear path, wherein the first edge of the obstruction is an edge of a side of the obstruction proximal to the preceding linear path. In FIG. 10, the first edge is the edge of a left side of the obstruction 20. The spaces to the left side of the obstruction 20 have been previously cleaned. Therefore, when the cleaning robot reaches the obstruction 20, spaces on the left side of the obstruction 20 under general circumstances will be lesser than spaces on a corresponding another side of the obstruction 20. If then a distance along a moving direction of the current linear path between the current obstruction point and the reference starting point is greater than or equal to the predetermined distance for turning (which means the area in front of the obstruction 20 has a large enough space that requires cleaning), the cleaning robot will bypass the left side of the obstruction 20 and quickly move to a front side of the obstruction 20 to continue cleaning. Accordingly, the cleaning efficiency of the cleaning robot is further enhanced.

Figure 11:
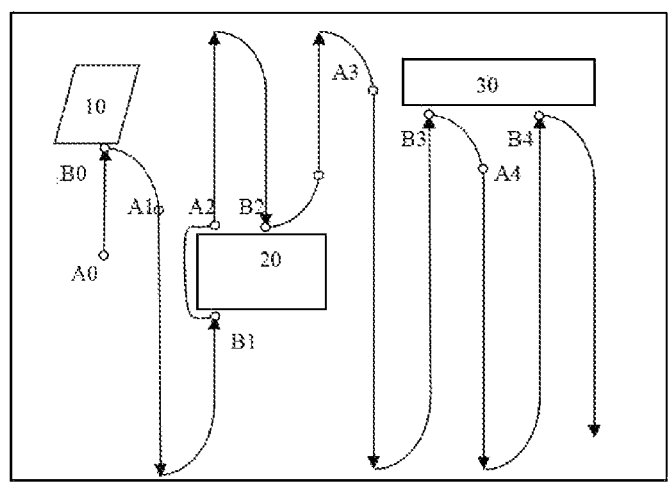
FIG. 11 is a second embodiment of the route of the cleaning robot when obstructions are detected during cleaning.

Preferably, if the linear path on which the current obstruction point is positioned is the first linear path, the reference starting point is the starting point of the first linear path. As shown in FIG. 11, the cleaning robot starts at the starting point A0 of the first linear path, and detects an obstruction 10 at the point B0. The point B0 is therefore the current obstruction point, and the starting point A0 is the reference starting point. Since the reference starting point is positioned on the current linear path behind the current obstruction point, the cleaning robot cannot determine a specific condition of the area in front of the obstruction 10. To avoid purposeless move, the cleaning robot turns back to clean those uncleaned areas adjacent to the path which has been cleaned. As such, the cleaning robot can have more purposeful and effective moves.

Figure 12:
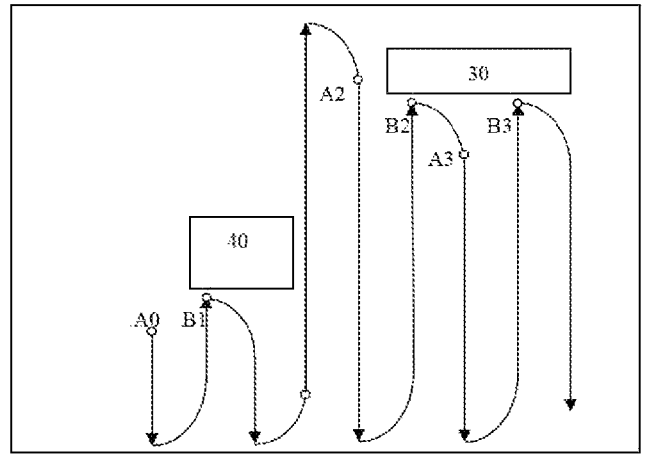
FIG. 12 is a third embodiment of the route of the cleaning robot when obstructions are detected during cleaning.

As shown in FIG. 12, the starting point A0 is a starting point of the first linear path. The cleaning robot starts to move at the starting point A0. When the cleaning robot reaches the point B1 on the second linear path, an obstruction 40 is detected. The point B1 is therefore the current obstruction point and the starting point A0 is the reference starting point. A projected point of the reference starting point projected vertically on the current linear path is behind the current obstruction point B1 based on a moving direction of the current linear path. Therefore, the cleaning robot turns back and moves on a next linear path (i.e. the third linear path). Since the projected point of the reference starting point on the first linear path is positioned behind the current obstruction point on the current linear path, and the area in front of the obstruction 40 has not been cleaned before, the cleaning robot cannot determine a specific condition of the area in front of the obstruction 40. To avoid purposeless move, the cleaning robot turns back to clean those uncleaned areas adjacent to the path which has been cleaned. As such, the cleaning robot can have more purposeful and effective moves.

Figure 13:
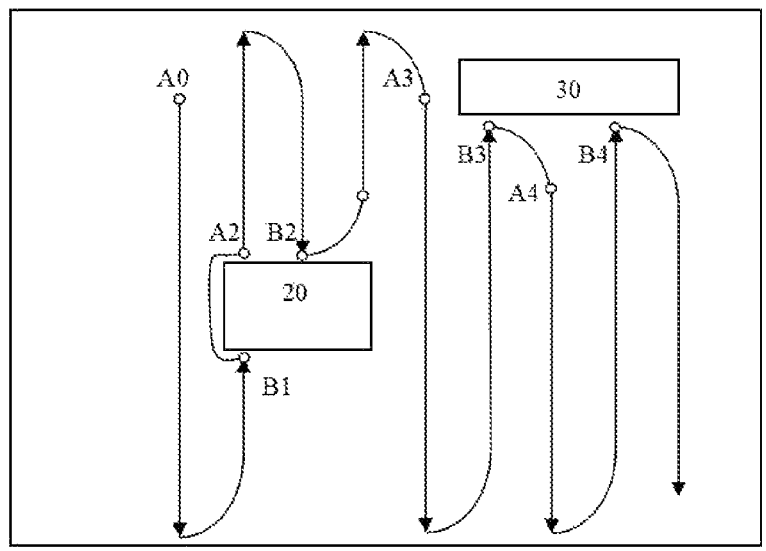
FIG. 13 is a fourth embodiment of the route of the cleaning robot when obstructions are detected during cleaning.
Figure 14:
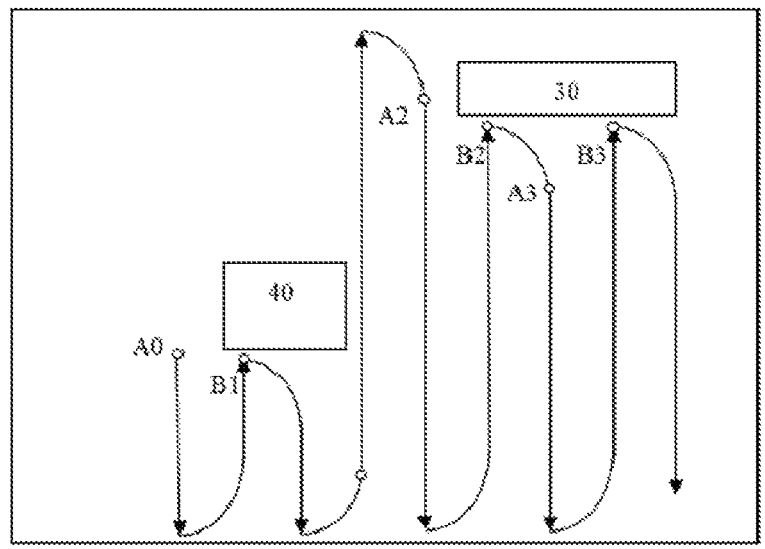
FIG. 14 is a fifth embodiment of the route of the cleaning robot when obstructions are detected during cleaning.

As shown in FIG. 13, the starting point A0 is a starting point of the first linear path. The cleaning robot starts to move at the starting point A0. When the cleaning robot moves to the point B1 of the second linear path, an obstruction 20 is detected. The point B1 is the current obstruction point and the starting point A0 is the reference starting point. A projected point of the reference starting point A0 projected vertically on the current linear path is in front of the current obstruction point B1 based on a moving direction of the current linear path, and a distance along a moving direction of the current linear path between the current obstruction point and the projected point of the reference starting point is greater than or equal to the predetermined distance for turning, it is determined that under general circumstances, there is a large enough area that requires cleaning in front of the obstruction 20. Therefore, the cleaning robot bypass the obstruction 20 along the first edge thereof, and revert back to the second linear path to continue moving on the second linear path to clean the uncleaned area in front of the obstruction 20 after bypassing the obstruction 20. As shown in FIG. 14, although a projected point of the reference starting point projected vertically on the current linear path is in front of the current obstruction point based on a moving direction of the current linear path, a distance along a moving direction of the current linear path between the current obstruction point and the projected point of the reference starting point is small than the predetermined distance for turning, therefore, it is determined that an area that requires cleaning in front of the obstruction 40 may be small. To increase cleaning efficiency, the cleaning robot turns back and moves on the third linear path to clean those uncleaned areas adjacent to the path which has been cleaned. As such, the cleaning robot can have more purposeful and effective moves.

Figure 15:
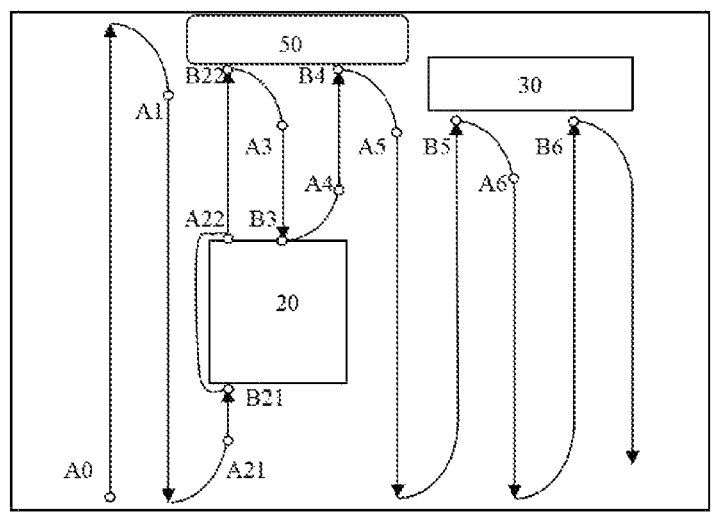
FIG. 15 is a sixth embodiment of the route of the cleaning robot when obstructions are detected during cleaning.

Preferably, if a preceding linear path preceding the current linear path is divided into multiple sub-sections, the reference starting point on the preceding linear path is a starting point of the last sub-section along a moving direction of the preceding linear path. As shown in FIG. 15, the third linear path comprises two sub-sections. The point A21 is a starting point of the first sub-section. When the cleaning robot moves to the point B21 of the first sub-section, an obstruction 20 is detected. Use starting the point A1 of the second linear path as the reference starting point, and determine a distance between a projected point of the reference starting point projected vertically on the third linear path and the point B21 (i.e. current obstruction point). Since the distance is greater than the predetermined distance for turning, the cleaning robot bypasses the obstruction 20 along a left side thereof, and then reverts back to a point A22 of a second sub-section of the third linear path. The point A22 is a starting point of the second sub-section. The cleaning robot continues to move on the second sub-section and detects another obstruction 50 at the point B22. The point B22 replaces the point B21 to be the current obstruction point. Use the starting point A1 of the second linear path as the reference starting point, and determine a distance between a projected point of the reference starting point projected vertically on the third linear path and the point B22 (i.e. current obstruction point). Since the distance is smaller than the predetermined distance for turning, the cleaning robot turns back and moves on the fourth linear path. The obstruction 20 is detected at the point B3 of the fourth linear path. The point B3 replaces the point B22 as the current obstruction point. Since the second sub-section is the last sub-section of the third linear path along a moving direction of the third linear path, the starting point A22 of the second sub-section replaces the point A21 as the reference starting point. The cleaning robot determines a distance between a projected point of the reference starting point A22 projected vertically on the fourth linear path and the point B3. Since the distance is smaller than the predetermined distance for turning, the cleaning robot turns back and moves on the fifth linear path. In the above circumstances, it can be generally concluded that the cleaning robot is positioned within an area between the two obstructions (20, 50). Therefore, the best way is to move to the area between the two obstructions and clean that area first, and other uncleaned areas are cleaned in a subsequent secondary cleaning stage. As such, the cleaning robot can have more purposeful and effective moves.

In the above handling method, the predetermined distance for turning is a predetermined value which can be preset according to user's requirement or different practical situations. The predetermined distance for turning can be 1.2, 1.3, 1.4 or 1.5 times the body width of the cleaning robot.

However, the predetermined distance for turning should be more than 1.0 time the body width of the cleaning robot so that the cleaning robot can get to the area effectively to perform cleaning.

Figure 16:
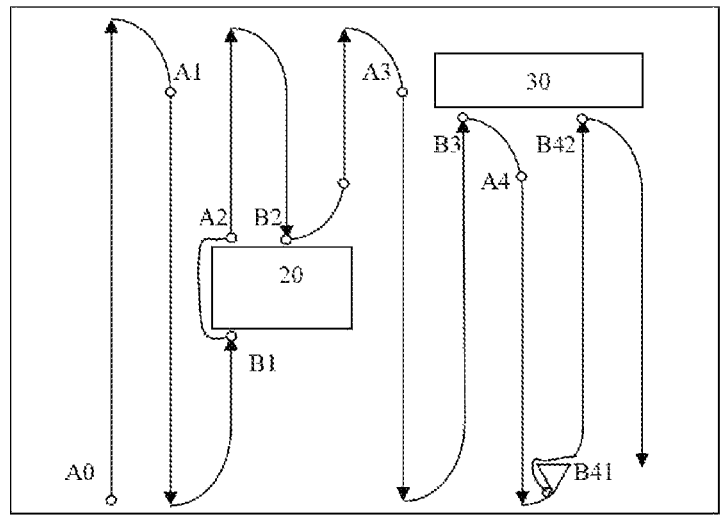
FIG. 16 is a seventh embodiment of the route of the cleaning robot when obstructions are detected during cleaning.
Figure 17:
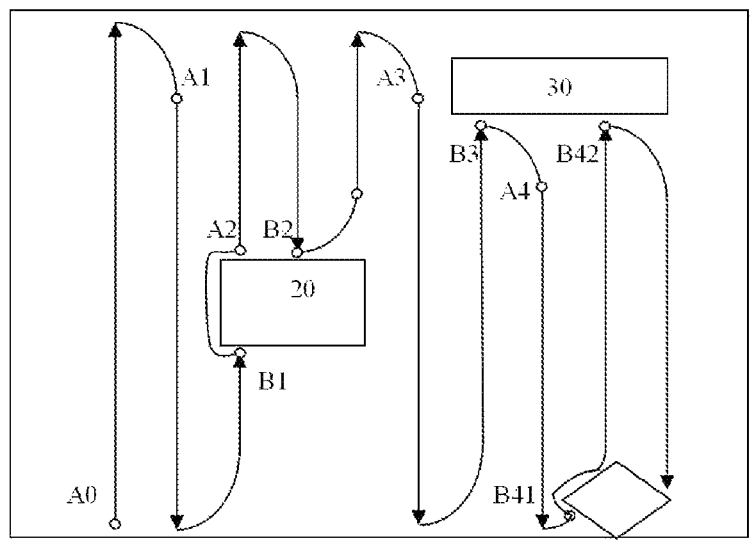
FIG. 17 is an eighth embodiment of the route of the cleaning robot when obstructions are detected during cleaning.

When an obstruction is detected during a turning of the cleaning robot, the cleaning robot directly moves along an edge of the obstruction; if a moving width has not yet exceeded a predetermined width after the cleaning robot has already bypassed the obstruction, the cleaning robot continues to move until it moves the predetermined width, and then continues to move along the linear path after turning; if the moving width has reached the predetermined width before the obstruction is bypassed, the cleaning robot will move along the linear path after turning when the predetermined width is reached. As shown in FIG. 16, during a turn after the eighth linear path, the cleaning robot detects an obstruction at the point B41 (i.e. the triangle as shown), therefore, the cleaning robot directly moves along an edge of the obstruction. A moving width of the cleaning robot has not yet exceeded a predetermined width after the cleaning robot has already bypassed the obstruction. Therefore, the cleaning robot continues to move until it moves the predetermined width, and then moves along the linear path after turning (i.e. the ninth linear path). Since turning of the cleaning robot generally indicates that the cleaning robot has reached a peripheral edge of an area to be cleaned. Therefore, the most effective operation is to find the next linear path as soon as possible. In this sense, it is not necessary to determine a relationship between the point B41 where the obstruction is detected and other points. It is only necessary to move along the edge of the obstruction. As shown in FIG. 17, when the cleaning robot has moved a width of the predetermined width while moving along the edge of an obstruction (the rhombus as shown), but the obstruction is still not yet bypassed, the cleaning robot will continue to move along the linear path after turning (i.e. the ninth linear path) when the predetermined width is reached. If the moving width of the cleaning robot is disregarded, the cleaning robot may easily move by a long distance along a large obstruction and thus move too far away, thereby missing some areas that are supposed to be cleaned. In the above, the moving width is a linear distance moved by the cleaning robot along a direction perpendicular to the linear paths. A path during turning is a curved path. A curved path used for turning can prevent interruption exists in the prior art in which right-angled turns are provided along the zig-zag route, thereby enhancing the smoothness and stability of the turning of the cleaning robot. The predetermined width is a body width of the cleaning robot. In other words, a width between two adjacent linear paths is the body width of the cleaning robot. As such, after the cleaning robot has moved on two adjacent linear paths, the area between the two adjacent linear paths will be cleaned once without any place being missed to be cleaned or being repeatedly cleaned. The predetermined width can also be set as other values based on different requirements.

Preferably, in step S1, the step of cleaning grid zones formed by the grids one by one comprises the following step: Starting from a zone cleaning starting point of a current grid zone, cleaning the current grid zone up to a zone cleaning finishing point of the current grid zone by following a zig-zag route having a curved bend at each turn; determining cleaned areas and entry edges of uncleaned areas based on the map of grids showing the current grid zone; configuring two entry reference points at two end points of two ends of each of the entry edges respectively; determining a most preferred entry point for the two entry reference points of each of the entry edges based on entry selection criteria; determining the most preferred entry point of a particular entry edge as a cleaning starting point of a prioritized cleaning area based on cleaning prioritizing criteria; moving from a current point of position to the cleaning starting point; cleaning the prioritized cleaning area according to predetermined cleaning criteria; after cleaning the prioritized cleaning area, determining a next most preferred entry point as a cleaning starting point of a next prioritized cleaning area according to entry selection criteria and cleaning prioritizing criteria, and so and so forth, until all uncleaned areas that satisfy cleaning criteria of uncleaned areas are cleaned; then moving to a zone cleaning starting point of a next grid zone.

Preferably, in step S2, the step of searching the map of the entire region to find out uncleaned areas not cleaned in step S1, and then cleaning the uncleaned areas comprises the following steps: determining cleaned areas and entry edges of uncleaned areas based on the map of the entire region; configuring two entry reference points at two end points of two ends of each of the entry edges respectively; determining a most preferred entry point among the two entry reference points of each of the entry edges based on entry selection criteria; determining the most preferred entry point of a particular entry edge as a cleaning starting point of a prioritized cleaning area based on cleaning prioritizing criteria; moving from a current point of position to the cleaning starting point; cleaning the prioritized cleaning area according to predetermined cleaning criteria; after cleaning the prioritized cleaning area, determining a next most preferred entry point as a cleaning starting point of a next prioritized cleaning area according to entry selection criteria and cleaning prioritizing criteria, and so and so forth, until all uncleaned areas that satisfy cleaning criteria of uncleaned areas are cleaned.

The map of grids or the map of the entire region is a plane map constructed by the cleaning robot by recording its own moving paths while cleaning. Construction of a plane map comprises the following steps: marking all grids which the cleaning robot has moved on as cleaned units; marking all grids detected with an obstruction as obstruction units; marking all grids which the cleaning robot has not moved on as uncleaned units; constructing the plane map based on the marked cleaned units, obstruction units and uncleaned units. The map of the entire region is a plane map formed by all the maps of grids.

Figure 18:
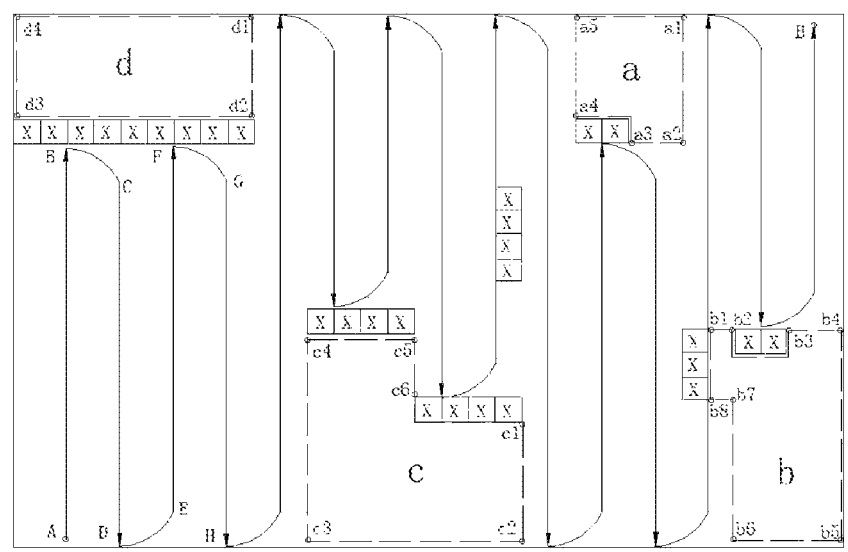
FIG. 18 is an illustration of grids of a grid zone according to the present invention.

As shown in FIG. 18, paths bearing arrows represent a moving route of the cleaning robot. The largest rectangle formed by four lines at the outermost sides represents peripheral edges of a grid zone or peripheral edges of the entire region. The starting point A is a point where the cleaning robot starts to move. The straight line AB bearing an arrow is a first linear path on which the cleaning robot moves. The direction pointed by the arrow of the straight line AB is the first direction. When the cleaning robot moves to the turning point B, the cleaning robot turns and moves according to a curved path. When the cleaning robot turns to the point C, the cleaning robot has a moving direction (i.e. a second direction) opposite to the moving direction of the first linear path. Straight line CD having such opposite moving direction is a second linear path of the cleaning robot. The point C is a starting point of the second linear path. The point D is a turning point of the second linear path. As shown in the figure, the straight lines bearing arrows are linear paths on which the cleaning robot moves. As shown in the figure, straight line EF is the third linear path, and the straight line GH adjacent to the right side of the third linear path is a fourth linear path, and so and so forth.

FIG. 18 shows a map of grids of a grid zone (most of the grids are not shown). The cleaning robot starts from the point A and clean the grid zone up to the point B by following a zig-zag route having a curved bend at each turn. When the cleaning robot reaches the point B, a general cleaning of the grid zone is complete. During a general cleaning process, the cleaning robot marks the grids that have been cleaned as cleaned unit, the grids where an obstruction is encountered as obstruction units (i.e. grids marked by "X" in FIG. 18), and the grids not cleaned by the general cleaning process as uncleaned units, thereby forming the schematic illustration shown in FIG. 18. In the figure, areas covered by the zig-zag route having a curved bend at each turn are cleaned areas, and areas designated by broken lines are uncleaned areas. After the general cleaning process, a secondary cleaning process is required to clean the uncleaned areas missed from cleaning in the general cleaning process. Therefore, it is necessary to first determine cleaned areas and entry edges (i.e. line segment d1-d2, line segment c1-c2; line segment c3-c4 etc) of uncleaned areas; treating points d1, d2, c1, c2, c3, c4 etc as entry reference points; determining a most preferred entry point among d1 and d2; determining a most preferred entry point among c1 and c2; determining a most preferred entry point among c3 and c4 etc; determining one of the most preferred entry points determined above as a prioritized cleaning point of a prioritized cleaning area; moving the cleaning robot from the point B to the prioritized cleaning point; cleaning the prioritized cleaning area; after cleaning the prioritized cleaning area, treat a cleaning finishing point of the prioritized cleaning area as a current point of position; after that, determining a next prioritized cleaning area and moving the cleaning robot to the next prioritized cleaning area to perform cleaning, and so and so forth, until all uncleaned areas are cleaned. This kind of secondary cleaning determines cleaned areas, and makes selection among the entry reference points of the entry edges of the uncleaned areas to determine a most preferred entry point for each entry edge; choosing one of the most preferred entry points as a cleaning starting point according to entry selection criteria, and cleaning the uncleaned area concerned according to predetermined cleaning criteria. This kind of secondary cleaning does not need to mark any positions, but requires only to determine the cleaned areas and select among the entry reference points at the end points of each entry edge of the uncleaned areas. Even if the terrains of the uncleaned area are complicated, it is only required to determine from each entry edge of each uncleaned area a most preferred entry point, and then a cleaning starting point of each uncleaned area can be determined more accurately, flexibly and objectively, and hence prioritized cleaning can be performed on a most suitable uncleaned area. Further, cleaning performed according to predetermined cleaning criteria can also prevent areas missed from cleaning which is a problem in the prior art which simply cleans along a zig-zag route starting from a marked position. As such, cleaning is more thorough and complete.

Preferably, said step of determining a most preferred entry point for the two entry reference points of each of the entry edges based on entry selection criteria comprises the following steps: constructing an XY coordinate system using a current point of position as an origin of the coordinate system; analyzing positions of the two entry reference points of a same entry edge in the coordinate system; if the two reference points have the same value on the X axis, selecting the reference point that is nearest to the current point of position as the most preferred entry point; if the two reference points have the same value on the Y axis, selecting the reference point that is nearest to the current point of position as the most preferred entry point; if the two reference points do not have the same value on both the X axis and Y axis, determining a positional relationship between the uncleaned area and a cleaned area; if the uncleaned area is positioned on a left side of the cleaned area, selecting the entry reference point with a larger value on the X axis as the most preferred entry point; if the uncleaned area is positioned on a right side of the cleaned area, selecting the entry reference point with a smaller value on the X axis as the most preferred entry point. As shown in FIG. 18, when the cleaning robot moves to the point B, the point B is a current point of position; constructing an XY coordinate system using the point B as an origin; analyzing positions of points a1 and a3 of the entry edge a1-a3 of area a of the uncleaned areas, and also analyzing positions of points a4 and a5 of the entry edge a4-a5 of area a of the uncleaned areas (since edge a1-a2 and edge a2-a3 are connected, they can be considered as a single edge); since points a1 and a3 do not have the same value on both X axis and Y axis, and area a is on the left side of a cleaned area, selecting point a1 having a larger value on X axis as the most preferred entry point (since points a1 and a3 both have negative values on X axis, a point which is nearer to the origin along X axis will have a larger value on the X axis); since points a4 and a5 have the same value on Y axis, select the point a5 which is nearer to the current point of position as another most preferred entry point of area a. Likewise, select points b2, b4 and b8 as the most preferred entry points of area b, select points c1, c5 and c4 as the most preferred entry points of area c, and select the point d1 as the most preferred entry point of area d. By using entry selection criteria, all entry edges of all uncleaned areas are analyzed, and the most preferred entry points are selected for subsequent selection of prioritized cleaning reference points. As such, even if the shapes of the uncleaned areas are complicated, a thorough and effective analysis can be made to determine which points are more suitable to be the most preferred entry points, such that the prioritized cleaning reference points can be more objectively and accurately selected.

Preferably, said step of determining one of the most preferred entry points as a cleaning starting point of a prioritized cleaning area based on cleaning prioritizing criteria comprises the following steps: selecting a most preferred entry point which is nearest to the current point of position in each uncleaned area as a prioritized cleaning reference point; selecting two prioritized cleaning reference points which are nearest to the current point of position; determining whether a difference in distance between the current point of position and the two prioritized cleaning reference points is smaller than a predetermined distance, if yes, comparing the corresponding entry edges on which the prioritized cleaning reference points are positioned and selecting the prioritized cleaning reference point positioned on a longer one of the corresponding entry edges as the cleaning starting point; if no, selecting the prioritized cleaning reference point which is nearest to the current point of position as the cleaning starting point. By analyzing the two prioritized cleaning reference points which are nearest to the current point of position together with the analysis of the lengths of the corresponding entry edges, an area that is more suitable for prioritized cleaning can be more thoroughly and accurately determined, thereby preventing the problem of low cleaning efficiency due to determination of a prioritized cleaning area based simply on whether a distance is greater or smaller, and hence increasing the effectiveness of cleaning of the cleaning robot. For example, when there are two areas which are both near to the current point of position, and the area which is the nearest to the current point of position has very short entry edges and another area has very long entry edges, it can be generally concluded that the area which is the nearest to the current point of position has a smaller size while another area has a larger size. If distance is the only factor concerned, the cleaning robot will prioritize the area having very short entry edges. However, this results in a larger area not being cleaned timely and hence lowering the cleaning efficiency and spoiling user's experience; also, when the cleaning robot prioritizes the area having very short entry edges, the cleaning robot has to spend a longer time to find the cleaning starting point due to reasons like erroneous map information or deviated movement of the cleaning robot. Therefore, the most effective way is to prioritize cleaning of the area having loner entry edges if two areas are both near to the current point of position. Only when their distances with the current point of position show a significant difference will the cleaning robot prioritizes the cleaning of the area which is nearer to the current point of position. If the cleaning robot moves a long distance to clean a possibly larger area far away from the current point of position instead of cleaning the area which is nearer, cleaning efficiency will be low because the cleaning robot spends too much time on moving to the area to be cleaned, and this makes a user to think that the cleaning robot is not intelligent enough, thereby affecting user's experience.

As shown in FIG. 18, after the most preferred entry points of all the uncleaned areas are determined, selecting the point a1 which is nearest to the point B among the most preferred entry points (a1 and a5) of area a as the prioritized cleaning reference point of area a; selecting the point b4 as the prioritized cleaning reference point of area b; selecting the point c1 as the prioritized cleaning reference point of area c; selecting the point d1 as the prioritized cleaning reference point of area d. After that, selecting the prioritized cleaning reference points a1 and b4 which are nearest to the point B; since a difference between a distance between a1 to B and a distance between b4 to B is larger than a predetermined distance, the cleaning robot selects the nearest the point a1 as the cleaning starting point. The predetermined distance is a preset value which can be different values based on specific need. In the present embodiment, the predetermined distance is two times the body width of the cleaning robot.

Preferably, said step of cleaning the prioritized cleaning area according to predetermined cleaning criteria comprises the following steps: determining a relationship between two end points of the entry edge on which the cleaning starting point is positioned; if the two end points have the same value on X axis, moving the cleaning robot from the cleaning starting point directly towards another end point of the entry edge and cleaning the prioritized cleaning area by following the zig-zag route having a curved bend at each turn; if the two end points have the same value on Y axis and if the prioritized cleaning area is situated above the entry edge, moving the cleaning robot along the positive direction of Y axis from the cleaning starting point and cleaning the prioritized cleaning area by following the zig-zag route having a curved bend at each turn; if the prioritized cleaning area is situated below the entry edge, moving the cleaning robot along the negative direction of Y axis from the cleaning starting point and cleaning the prioritized cleaning area by following the zig-zag route having a curved bend at each turn; if the two end points have different values both on X axis and Y axis, moving the cleaning robot towards a direction perpendicular to the X axis of another end point, and cleaning the prioritized cleaning area by following the zig-zag route having a curved bend at each turn.

As shown in FIG. 18, when cleaning area a, determine a positional relationship between point a1 and point a3; since point a1 and point a3 have different values both on X axis and Y axis, the cleaning robot moves from point a1 towards a direction perpendicular to the X axis of point a3 (i.e. towards point a2), and then clean area a from right to left by following a zig-zag route having a curved bend at each turn. As said before, a zig-zag route having a curved bend at each turn is different from an ordinary zig-zag route in that, during turning, an ordinary zig-zag route employs two right-angled turns to achieve turning, but the zig-zag route according to the present invention follows a curved path when turning. By determining the positional relationship between two end points of the entry edge and initiating different moves of the cleaning robot to start cleaning, the problem of missing areas that are supposed to be cleaned at corners and edges of an uncleaned area having a complicated shape can be solved, thereby enhancing the coverage of completeness of the cleaning performed by the cleaning robot. After area a is cleaned, the cleaning robot is at the cleaning finishing point (i.e. point a5). Treat point a5 as a current point of position. Select point d1, c1, c4, c5, b1, b3 and b8 as the most preferred entry points according to entry selection criteria. Determine point d1 as the cleaning starting point according to cleaning prioritizing criteria. After the cleaning robot moves from point a5 to point d1, the cleaning robot moves towards point d2 and clean area d from right to left by following the zig-zag route having a curved bend at each turn. When the cleaning robot reaches the cleaning finishing point (i.e. point d4), cleaning of area d is completed. Treat point d4 as the current point of position and determine point c4 as the cleaning starting point based on entry selection criteria and cleaning prioritizing criteria. After the cleaning robot moves from point d4 to point c4, the cleaning robot moves towards point c3 and cleans area c from left to right by following the zig-zag route having a curved bend at each turn. When the cleaning robot reaches the cleaning finishing point (i.e. point c1), cleaning of area c is completed. Lastly, treat point c1 as the current point of position. Determine point b8 as the cleaning starting point according to entry selection criteria and cleaning prioritizing criteria. After the cleaning robot moves from point c1 to point b8, the cleaning robot moves towards a direction perpendicular to the X axis of point b6 and cleans area b from left to right by following the zig-zag route having a curved bend at each turn. When the cleaning robot reaches the cleaning finishing point (point b4), cleaning of area b is completed.

Preferably, determining whether the cleaning criteria of an uncleaned area are satisfied comprises the following step: determining whether all entry edges of an uncleaned area have lengths all smaller than a predetermined entry length; if yes, the uncleaned area of the entry edges concerned does not satisfy the cleaning criteria of the uncleaned area; if no, the uncleaned area of the entry edges concerned satisfies the cleaning criteria of the uncleaned area. The predetermined entry length is a preset value which can be different values according to specific need. In the present embodiment, the predetermined entry length is 1.2 times the body width of the cleaning robot. When there is an entry edge having a length greater than or equal to 1.2 times the body width of the cleaning robot, the cleaning robot can get through the entry edge and clean the uncleaned area. If all the entry edges are smaller than 1.2 times the body width of the cleaning robot, it is difficult or impossible for the cleaning robot to move into the uncleaned area to perform cleaning, and so such uncleaned area will not subject to secondary cleaning and will be handled at subsequent cleaning stages. By using lengths of the entry edges to determine whether the cleaning robot can enter the uncleaned area, the efficiency of secondary cleaning is improved, and the cleaning robot is prevented from spending extra time to move to the uncleaned area only to find out that it cannot be entered for cleaning.

Preferably, moving from the current point of position to the cleaning starting point comprises the following steps: searching the map of grids, treating a path disposed with predetermined moving points from the current point of position to the cleaning starting point as a predetermined moving path; treating the grid on which the current point of position is situated as a current grid, and treating a next grid along a direction of the predetermined moving path as a path reference grid; determining whether grids within a predetermined distance at any one side of the path reference grid perpendicular to the predetermined moving path are obstruction units, if no, treating the predetermined moving point corresponding to the path reference grid as a moving point, and if yes, determining whether grids within a predetermined distance at another side of the path reference grid are obstruction units, if yes, treating the predetermined moving point corresponding to the path reference grid as a moving point, if no, treating a point deviated from the predetermined moving point corresponding to the path reference grid by a set distance towards a direction away from the obstruction unit as a moving point; after that, treating a next next grid as the path reference grid and repeating the subsequent processing steps described above, and so and so forth, until the last grid subject to the above described processing steps is a grid where the cleaning starting point is positioned, and then the above described processing ends; and lastly treating a path disposed with moving points determined according to the above processing steps from the current point of position to the cleaning starting point as the moving path. The present invention modifies the predetermined moving path searched according to the path searching algorithm in the prior art, namely that, the present invention deviates the predetermined moving point which is positioned along the predetermined moving path and which corresponds to the grid near to an obstruction unit to create a moving path which is spaced apart from obstruction units by certain distances. When the cleaning robot follows this moving path, the cleaning robot will not easily hit an obstruction and therefore has an improved moving efficiency. Also, the navigation from the current point of position to the cleaning starting point will not be affected and thus achieving more accurate navigation and higher efficiency.

If a grid within a predetermined distance in front of a path reference grid is an obstruction unit, determining whether grids within a predetermined distance at any one side along a direction perpendicular to the predetermined moving path are obstruction units, if yes, treating a point deviated from the predetermined moving point corresponding to the path reference grid by a set distance towards a first predetermined direction as a moving point, wherein the first predetermined direction is an integrated direction that integrates a direction deviated from obstructions at the sides and a direction deviated from obstructions at the front; if no, treating a point deviated from the predetermined moving point corresponding to the current grid by a set distance towards a second predetermined direction as a moving point, wherein the second predetermined direction is an integrated direction that integrates a direction from the path reference grid to a next grid along a direction of the predetermined moving path and a direction deviated from the obstruction unit at the front. A predetermined moving path obtained according to the path searching algorithm in the prior art will not navigate the cleaning robot to a position having obstruction units on three sides. Therefore, it is only necessary to determine whether obstruction units exist on one side along a direction perpendicular to the predetermined moving path. It is not necessary to consider whether obstruction units exist on the other side. As such, data processing of the cleaning robot can be eased of its burden and the control efficiency of the cleaning robot can be improved. Further, by controlling the cleaning robot to move in a deviated direction according to the first predetermined direction or the second predetermined direction, moving efficiency is improved as the cleaning robot will not easily hit an obstruction while turning.

The predetermined distance is a preset value which can be different values according to specific need. Preferably, the predetermined distance can be the total length of two grids. The set distance is also a preset value which can be different values according to specific need. Preferably, the set distance can be one fourth or half the length of a grid.

Figure 19:
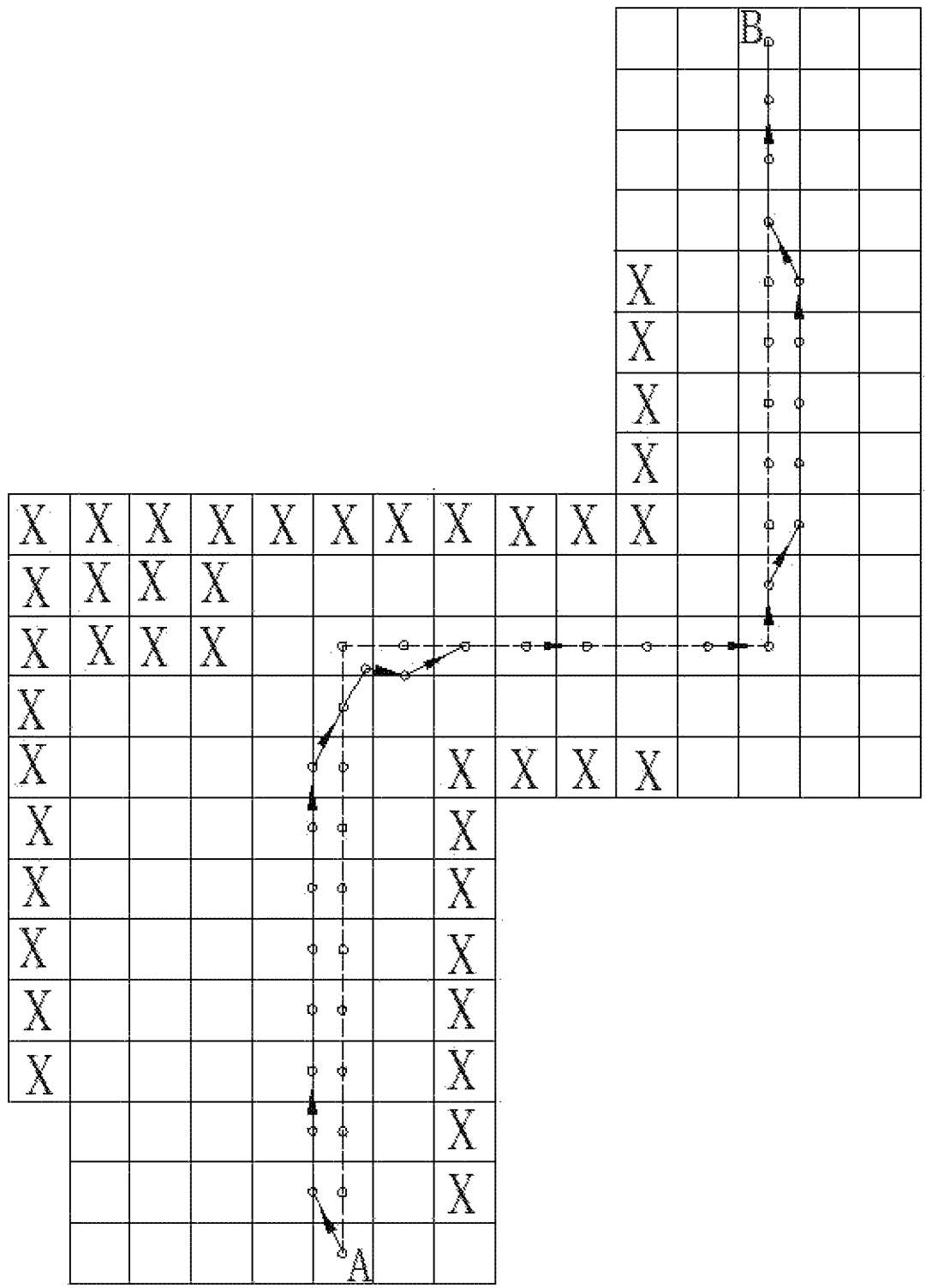
FIG. 19 shows a most preferred route of the cleaning robot on the grids.

As shown in FIG. 19, each square represents a grid, and each small circle represents a point. IN the present embodiment, a body width of the cleaning robot is a sum of the lengths of two grids. Therefore, when the cleaning robot starts to move from the point A along a predetermined moving path (i.e. the path indicated by broken lines), the cleaning robot will occupy the grids where the broken line is situated and one half of each grid at each side along the broken line. In other words, the cleaning robot is spaced apart from the obstruction units at the right side by a distance of one half of a grid. In the figure,the point A is the current point of position and the point B is the cleaning starting point. A path formed by predetermined moving points 1-26 corresponding to the grids on which the broken lines run between the point A and the point B is a predetermined moving path found according to the path searching algorithm (A* algorithm). Since the predetermined moving path is near to the obstruction units (i.e. grids marked as X in the figure), the cleaning robot may easily hit the obstructions affecting its moving efficiency if the cleaning robot follows this predetermined moving path. The line bearing arrows is the moving path determined according to the method provided by the present invention. Specifically, treating the grid where the point A is positioned as the current grid; treating a next grid of the grid where the point A is positioned along a direction of the predetermined moving path as a path reference grid (i.e. that is the grid above and adjacent to the current grid, hereinafter referred to as the first grid); since an obstruction unit exists two grids away on a right side of the first grid, and no obstruction unit exists on a left side of the first grid within a predetermined distance (i.e. total length of two grids), a point deviated from the predetermined moving point corresponding to the first grid by a set distance towards a direction away from the obstruction unit is set as a moving point (i.e. deviate the predetermined moving point corresponding to the first grid by a distance of one half of the length of the grid towards the left side of the first grid and treat that point as the moving point); next, treating the first grid as the current grid; since an obstruction unit exists two grids away on a right side of a second grid (i.e. the grid above and adjacent to the first grid), and no obstruction unit exists on a left side of the second grid within a total length of two grids, a point deviated from the predetermined moving point corresponding to the second grid by a set distance towards a direction away from the obstruction unit is set as a moving point (i.e. deviate the predetermined moving point corresponding to the second grid by a distance of one half of the length of the grid towards the left side of the second grid and treat that point as the moving point). Likewise, the predetermined moving points corresponding to the third to eighth grids are all deviated to the left side by one half of the length of the grid. As for the ninth grid, since obstruction units do not exist on both the left and right sides of the ninth grid within the predetermined distance, the predetermined moving point corresponding to the ninth grid is the moving point. Next, since an obstruction unit exists two grids away in front of the tenth grid, and another obstruction unit exists two grids away on the left side of the tenth grid, a point deviated from the predetermined moving point corresponding to the tenth grid towards an integrated direction by one half of the length of the grid is set as a moving point, wherein the integrated direction (i.e. an direction towards the lower right corner) integrates a direction away from the obstruction unit at the sides (i.e. a direction horizontally directed to the right) and a direction away from the obstruction unit at the front (i.e. a direction that is directed vertically downward). Continue to follow along a direction of the predetermined moving path, since an obstruction unit exist two grids away on the left side of the eleventh path and there is no obstruction unit at the right side, a point deviated from the predetermined moving point corresponding to the eleventh grid by one half of the length of the grid towards the right side of the eleventh grid is set as a moving point. Since obstruction units exist two grids away to both the left side and right side of the twelfth grid, the predetermined moving point corresponding to the twelfth grid is treated as the moving point. Likewise, the predetermined moving points corresponding to the thirteenth to fifteen grid are treated as the moving points. For the sixteenth grid, since obstruction units do not exist on both the left side and right side of the sixteenth grid within the predetermined distance, the predetermined moving point corresponding to the sixteenth grid is treated as the moving point. Likewise, the predetermined moving points corresponding to the seventeenth grid and the eighteenth grid are treated as the moving points. As for the nineteenth grid, since an obstruction unit exists two grids away on a left side of a nineteenth grid, and no obstruction unit exists on a right side of the nineteenth grid, a point deviated from the predetermined moving point corresponding to the nineteenth grid by a distance of one half of the length of the grid towards the right side of the nineteenth grid is set as a moving point. Likewise, points deviated from the predetermined moving points corresponding to the twentieth to twenty third grids to their right sides by one half of the length of the grid are considered as the moving points. Since obstruction units do not exist on both the left sides and the right sides by the predetermined distance for all the twenty fourth to twenty sixth grids, the predetermined moving points corresponding to the twenty fourth to twenty sixth grids are considered as the moving points. Since the grid on which point B is positioned is a target grid, the processing steps described above end. A path formed by the moving points from point A to point B is the moving path, which is the line bearing arrows as shown in the figure. The moving path of the present invention is an adjusted path based on the originally searched path adjusted according to different situations along the path. The cleaning robot can therefore be effectively protected from hitting against the obstructions, thereby ensuring high moving efficiency of the cleaning robot. Further, as the cleaning robot is prevented from hitting the obstructions, there will be less deviation from the planned path in the course of moving, thereby improving navigation efficiency.

Preferably, a coordinate of a predetermined moving point is determined according to the following steps: treating a coordinate of any grid along the moving path as (X, Y), treating a length of any grid being h, and width being w; treating a coordinate of any predetermined moving point as (x, y), then $x=X*h+h/2$, and $y=y*w+w/2$. When the cleaning robot is searching the map of grids, existence of an obstruction unit is determined be reference to grids, while actual moving of the cleaning robot are achieved by reference to points, therefore a path shown by reference to grids found after searching the map of grids should be converted to specific predetermined moving points so as to obtain the predetermined moving path of the cleaning robot. For example, assuming a coordinate of a grid adjacent a left side of the grid where point A is positioned as (0, 0), therefore, in a coordinate system constructed having a point at a lower left corner of grid (0, 0) as an origin of the coordinate system, the grid where point A is positioned has a coordinate (1, 0), and the first grid has a coordinate (1, 1). The length and width of each grid are the both 0.2 m. Therefore, the predetermined moving point of the first grid has a coordinate (0.3 m, 0.3 m). In other words, the predetermined moving point of the first grid is a point at 0.3 m along a positive direction of X axis and 0.3 m along a positive direction of Y axis, which means a center point of the first grid. the coordinate of the second grid is (1, 2), and the coordinate of the predetermined moving point of the second grid is (0.3, 0.5). In other words, the predetermined moving point of the second grid is a point at 0.3 m along a positive direction of X axis and 0.5 m along a positive direction of Y axis, which means a center point of the second grid. By converting the path searched by reference to grids to a predetermined moving path formed by specific predetermined moving points, the cleaning robot can move according to points having specific coordinates, thereby improving the moving accuracy of the cleaning robot. Besides, predetermined moving points positioned at respective centers of the grids facilitate subsequent planning of the moving path of the cleaning robot. Grids being searched can have a different length and a different width apart from the length and width specified in the embodiment described above according to different practical situations, and the length and width can be different from each other.

Preferably, after treating a path disposed with moving points from the current point of position to the cleaning starting point as the moving path, further steps are comprised as follows: determining a current moving point, a next moving point, and a next next moving point based on the moving path; treating a direction from the current moving point to the next moving point as a current direction; treating a direction from the next moving point to the next next moving point as a changeable direction; when the cleaning robot moves from the current moving point by a predetermined distance towards the next moving point, determining whether the changeable direction is the same as the current direction, if yes, maintaining the current direction and a current speed to continue moving, if no, adjusting the current direction and the current speed so that the cleaning robot follows a curved path when moving from a point reached after having moved from the current moving point by the predetermined distance to the next next moving point; the steps above repeat until the next next moving point is the cleaning starting point. An adjusted moving path is considered the most preferred moving route.

Said step of adjusting the current direction and the current speed so that the cleaning robot follows a curved path when moving from a point reached after having moved from the current moving point by the predetermined distance to the next next moving point comprises the following steps: predicting a projected moving distance in a next period of moving based on the current speed; determining whether the projected moving distance is greater than a remaining distance between the next moving point and a point reached by the cleaning robot after having moved from the current point of position towards the next moving point by the predetermined distance; if no, continuing to move according to the current speed; if yes, reducing the current speed and adjusting a difference in speed between the inner wheel and the outer wheel so that the moving direction of the cleaning robot changes gradually from the current direction to a direction consistent with the changeable direction.

Said step of adjusting the difference in speed between the inner wheel and the outer wheel so that the moving direction of the cleaning robot changes gradually from the current direction to the direction consistent with the changeable direction comprises the following steps: determining whether an angle between the changeable direction and the current direction is smaller or equal to 45 degrees, if yes, configuring a speed of the inner wheel being one fourth of a speed of the outer wheel; if no, configuring the speed of the inner wheel being one sixth of the speed of the outer wheel; calculating a projected difference in moving distance between the inner wheel and the outer wheel within a predetermined period of time in the future, wherein said projected difference in moving distance is a product of an absolute value of the difference in speed between the inner wheel and the outer wheel times the predetermined period of time in the future; calculating a projected variation of moving angle by dividing the projected difference in moving distance by a width between the inner wheel and the outer wheel; determining whether a difference between the current direction and the changeable direction is smaller than the projected variation of moving angle, if no, maintaining the current speed of the outer wheel and the inner wheel, if yes, adjusting the speed of the outer wheel or the speed of the inner wheel so that the speed of two wheels are the same.

As shown in FIG. 19, counting from point A along the direction indicated by the arrows, with the circle at point A excepted and not counted, a point represented by a first circle is a first moving point, a point represented by a second circle is a second moving point, and so and so forth; a point represented by a circle below point B is the twenty sixth moving point. A direction (i.e. the current direction) from the current point A towards the first moving point forms an angle of 112.5 degrees (in this angle calculation, the current point is considered as an origin, a direction horizontally towards a right side of the origin is a positive direction of X axis, and a direction vertically upward from the origin is a positive direction of Y axis; an included angle between the positive direction of X axis and a line from point A to the first moving point is 112.5 degrees. Angle calculation based on different directions may also be possible). A direction (changeable direction) from the first moving point to the second moving point forms an angle of 90 degrees. When the cleaning robot moves from point A towards the first moving point by one half the length of the grid, it is determined that the changeable direction is different from the current direction, and it is calculated that in the next time period T1, the projected moving distance of the cleaning robot is V*T1, which is greater than half of a distance from point A to the first moving point, therefore the current speed V of the cleaning robot will be reduced by half; and then it is determined that an angle between the changeable direction and the current direction is smaller than 45 degrees, so the difference in speed between the inner wheel and the outer wheel has to be adjusted, so that the speed V1 of the inner wheel is one fourth of the speed V2 of the outer wheel, and then the cleaning robot will start to turn by following a curved path. During the turn, calculate a projected variation of moving angle of the cleaning robot within a time period T2 in the future as $\Delta\theta=(|V1-V2|*T2)/W$, wherein W is a width between the inner wheel and the outer wheel of the cleaning robot. During the turn, the angle between the current direction and the changeable direction will become smaller and smaller, and when this angle is smaller than the projected variation of moving angle $\Delta\theta$, the speed of the inner wheel or the speed of the outer wheel will be adjusted so that both the inner wheel and the outer wheel will have the same speed. During adjustment, the cleaning robot will have minor changes in angle exactly enough to compensate the angle between the current direction and the changeable direction. Therefore, when the cleaning robot reaches the second moving point, the cleaning robot moves forward linearly according to the changeable direction.

Since the current direction and the changeable direction of each of the second moving point to the seventh moving point are consistent, therefore the cleaning robot keeps moving linearly. When the cleaning robot is about to reach the eighth moving point, since the direction (i.e. current direction) from the seventh moving point to the eighth moving point forms an angle of 90 degrees, and the direction (i.e. changeable direction) from the eighth moving point to the ninth moving point forms an angle of 67.5 degrees, the cleaning robot, when having moved from the seventh moving point towards the eighth moving point by one half the length of the grid, determines that the changeable direction is different from the current direction, and it is calculated that in the next time period T1, the projected moving distance of the cleaning robot is V*T1, which is greater than half a distance from the seventh moving point to the eighth moving point, therefore the current speed V of the cleaning robot will be reduced by half; and then it is determined that an angle between the changeable direction and the current direction is 22.5 degrees, which is smaller than 45 degrees, so the difference in speed between the inner wheel and the outer wheel has to be adjusted, so that the speed V1 of the inner wheel is one fourth of the speed V2 of the outer wheel. If the angle between the changeable direction and the current direction is greater than 45 degrees, the inner speed V1 of the inner wheel has to be adjusted to one sixth of the speed V2 of the outer wheel such that the variation of angle can be more quickly adjusted; the inner speed V1 of the inner wheel is adjusted to one fourth of the speed V2 of the outer wheel again only when the angle between the changeable direction and the current direction is smaller than 45 degrees such as to reduce the variation of angle to prepare for subsequent fine adjustment. Now the cleaning robot starts to turn according to a curved path. During its turn, calculate a projected variation of moving angle of the cleaning robot within a time period T2 in the future as $\Delta\theta=(|V1-V2|*T2)/W$, wherein W is a width between the inner wheel and the outer wheel of the cleaning robot. During the turn, the angle between the current direction and the changeable direction will become smaller and smaller, and when this angle is smaller than the projected variation of moving angle $\Delta\theta$, the speed of the inner wheel or the speed of the outer wheel will be adjusted so that both the inner wheel and the outer wheel will have the same speed. During adjustment, the cleaning robot will have minor changes in angle exactly enough to compensate the angle between the current direction and the changeable direction. Therefore, the cleaning robot will eventually move forward linearly according to the changeable direction (i.e. the direction from the eighth moving point to the ninth moving point).

Likewise, for other sections of the moving path where the current direction is different from the changeable direction and a turn is required, for example the section from the ninth moving point to the tenth moving point, the section from the eleventh moving point to the twelfth moving point, and the section from the sixteen moving point to the seventeenth moving point and to the eighteen moving point etc, follow the steps described above to adjust the speed of the inner wheel and the speed of the outer wheel so that the cleaning robot follows a curved path during its every turn. Eventually, a path modified with curved turning paths is deemed as the most preferred moving path.

Figure 20:
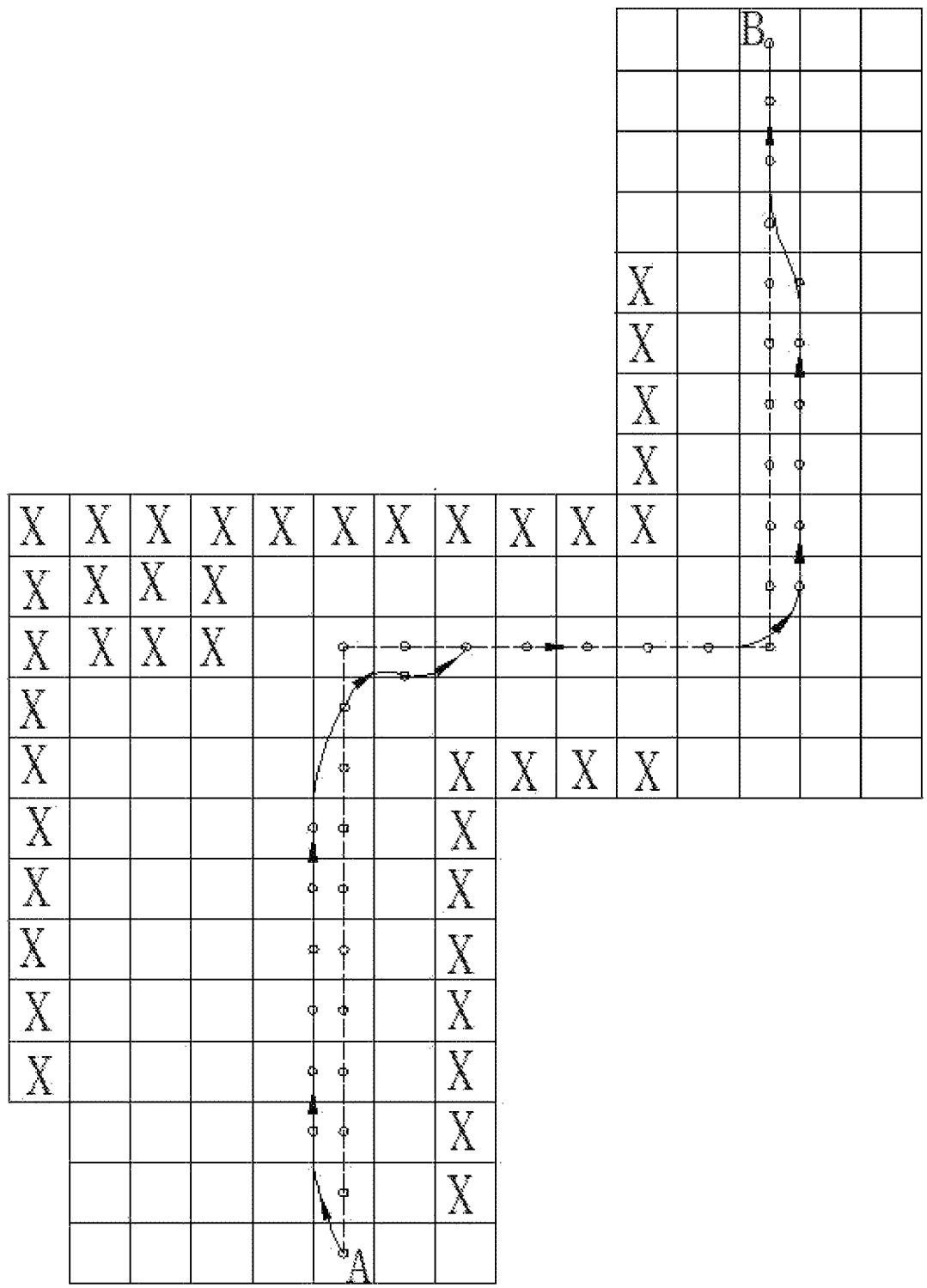
FIG. 20 shows a most preferred route of the cleaning robot on the grids after the route has been modified with curved bends.

As shown in FIG. 20, at each turn of the cleaning robot along the path bearing arrows, the cleaning robot follows a curved path. By following a curved path at each turn, the cleaning robot can move more smoothly without the problem of interruption, thereby enhancing the moving efficiency of the cleaning robot.

T1 and T2 are predetermined values which can be configured as different values. In the present embodiment, T1 and T2 are configured as a multiple of 10 ms, particularly 30 ms.

FIG. 18 shows a map of a grid zone. A predetermined length of the grid zone is 4 m. A predetermined width of the grid zone is 3 m. Of course, the predetermined length and the predetermined width can be configured as other values based on practical situations. After general cleaning of the grid zone, the cleaning robot determines the cleaned areas and the entry edges of the uncleaned areas, and then cleans the uncleaned areas (i.e. secondary cleaning). After second cleaning of the grid zone, the cleaning robot moves to the next grid zone to perform general cleaning and secondary cleaning, until a map of the entire region is formed after all grid zones are subject to general cleaning and secondary cleaning. Likewise, in the entire region formed by the grid zones, cleaned areas and uncleaned areas also exist. The cleaning robot performs secondary cleaning of the uncleaned areas of the entire region according to the method of performing secondary cleaning disclosed by the present invention.

Preferably, cleaning peripheral areas of the entire region based on the map of the entire region according to step S3 comprises the following steps: By reference to the map of the entire region, determining the nearest peripheral point of the map of the entire region from the current point of position as a periphery starting point; moving the cleaning robot from the current point of position to the periphery staring point and starting to clean along the periphery; by reference to the periphery staring point, determining whether a distance the cleaning robot has moved is greater than a perimeter of the peripheries of the map of the entire region, determining whether the cleaning robot has rotated more than 360 degrees, and determining whether the cleaning robot is positioned within a predetermined range from the periphery staring point; if any one of the above returns an answer "no", continuing to clean along the periphery; if all of the above return an answer "yes", ending the cleaning along the periphery of the entire region as the cleaning is completed.

After general cleaning and secondary cleaning, only corners and edges are left uncleaned in general circumstances. Therefore, cleaning the peripheral areas of the entire region can effectively clean those areas that are stilled uncleaned. However, during cleaning along the peripheral areas of the entire region, the cleaning robot may not accurately determine whether it has finished moving completely along the peripheries of the entire region due to complicated terrain of the entire region and deviated move of the cleaning robot. Accordingly, the present invention introduces three criteria including the distance the cleaning robot has moved, the angle the cleaning robot has rotated and the position of the periphery staring point, to determine whether the cleaning robot has finished moving completely along the peripheries of the entire region, so as to prevent the problem of duplication if the cleaning robot moves repeatedly along the peripheries and the problem of incomplete cleaning if the cleaning robot has not moved completely along the peripheries.

Preferably, in the course of cleaning the peripheral areas of the entire region, if there are consecutively M grids detected as uncleaned grids, it is determined that a new area exists, and the new area will be cleaned first according to the zig-zag route having a curved bend at each turn; after the new area has been cleaned, the cleaning robot continues to clean the peripheral areas of the entire region. M is a natural number greater than or equal to 4. Due to erroneous map information or deviated move of the cleaning robot, areas having relatively shorter entry edges may not be found initially. Therefore, during the course of cleaning the peripheral areas of the entire region, the cleaning robot carries out detection while cleaning the peripheral areas of the entire region. If uncleaned grids are detected and there are at least four consecutively uncleaned grids, it is determined that a new uncleaned area exists. Therefore, the cleaning robot will clean this uncleaned area by following a zig-zag route having a curved bend at each turn. Likewise, after general cleaning and secondary cleaning of this new uncleaned area according to the steps described above, the cleaning robot continues to clean the peripheral areas of the entire region. When the three criteria as mentioned above are all satisfied, the cleaning of the peripheral areas of the entire region ends. The cleaning robot returns to the original point to recharge or stand-by according to step S4.

A chip is also provided by the present invention which stores procedures for controlling the cleaning robot to implement the method of planning a cleaning route as mentioned above. The above method provided by the present invention cleans a floor surface grid zone by grid zone until an entire region is cleaned, and then establishes a map of the entire region based on information recorded during cleaning. As such, the present invention solves the problem of low efficiency in the prior art robots which have to construct a map first before cleaning. The present invention enables general cleaning to be performed at the same time of constructing a map so as to increase the cleaning efficiency of the cleaning robot. After that, uncleaned areas not cleaned in the previous general cleaning step are searched and found and then subsequently cleaned according to the map of the entire region. As such, there will not be any missing areas not cleaned in the previous general cleaning step, and also, the missing areas can be quickly searched and found through the map of the entire region constructed in the previous general cleaning step so as to achieve higher efficiency of cleaning the missing areas. Lastly, peripheral areas of the entire region are cleaned based on the map of the entire region so that corners and edges are completely cleaned. As such, the cleaning robot has a higher percentage of coverage of the floor to be cleaned and thus ensures good cleaning effects. The above method is a kind of bionic algorithm that simulates human thinking so that the cleaning robot can plan a cleaning route and perform cleaning more intelligently. The present invention increases the cleaning efficiency of the cleaning robot and a coverage percentage of the cleaning areas to ensure good cleaning effect.

The embodiments described above are intended to sufficiently disclose the present invention and should not be considered limiting the present invention. All replacements of features which are obvious without the need for inventive effort and which are based on the inventive concept of the present invention and achieves the same technical effects should be considered falling within the scope of the present invention.

What is claimed is:

1. A method of planning a cleaning route for a cleaning robot, comprising the following steps:

starting from an original point based on maps of grids, cleaning grid zones formed by the grids one by one until an entire region is cleaned, and then establishing a map of the entire region;

searching the map of the entire region to find out uncleaned areas, and then cleaning the uncleaned areas;

cleaning peripheral areas of the entire region based on the map of the entire region;

returning to the original point;

the step of searching the map of the entire region to find out uncleaned areas, and then cleaning the uncleaned areas comprises the following steps:

determining cleaned areas and entry edges of uncleaned areas based on the map of the entire region;

configuring two entry reference points at two end points of two ends of each of the entry edges respectively;

determining a most preferred entry point among the two entry reference points of each of the entry edges based on entry selection criteria;

determining the most preferred entry point of a particular entry edge as a cleaning starting point of a prioritized cleaning area based on cleaning prioritizing criteria;

moving from a current point of position to the cleaning starting point; cleaning the prioritized cleaning area according to predetermined cleaning criteria;

after cleaning the prioritized cleaning area, determining a next most preferred entry point as a cleaning starting point of a next prioritized cleaning area according to entry selection criteria and cleaning prioritizing criteria, and so and so forth, until all uncleaned areas that satisfy cleaning criteria of uncleaned areas are cleaned.

2. The method of claim 1, wherein the step of cleaning the grid zones formed by the grids one by one comprises the following steps:

starting from the original point, moving forward linearly along a first direction; cleaning a first grid zone on one side along the first direction, and then cleaning other adjacent grid zones of the same row one by one; returning to a second grid zone adjacent to the first grid zone along the same column, and then cleaning the second grid zone and also cleaning other adjacent grid zones of the same row one by one;

applying the above cleaning processes so and so forth until all grid zones of the same column of the first grid zone along the first direction as well as all adjacent grid zones along the same row of each of these grid zones along the same column of the first grid zone are cleaned;

returning to the original point;

starting from the original point, moving forward linearly along the first direction; cleaning a third grid zone on another side along the first direction, and then cleaning other adjacent grid zones of the same row one by one; returning to a fourth grid zone adjacent to the third grid zone along the same column, and then cleaning the fourth grid zone and also cleaning other adjacent grid zones of the same row on by one;

applying the above cleaning processes so and so forth until all grid zones of the same column of the third grid zone along the first direction as well as all adjacent grid zones along the same row of each of these grid zones along the same column of the third grid zone are cleaned;

wherein each of the grid zones is a rectangular zone having a predetermined length and a predetermined width; and the cleaning robot cleans each of the grid zones by following a zigzag route having a curved bend at each turn.

3. The method of claim 1, wherein the step of cleaning the grid zones formed by the grids one by one comprises the following steps:

starting from the original point, moving forward linearly along a first direction; cleaning a first grid zone on one side along the first direction, and then cleaning other adjacent grid zones of the same row one by one;

returning to the original point;

starting from the original point, moving forward linearly along a second direction opposite to the first direction, cleaning a third grid zone which is on the same side and along the same column as the first grid zone, and then cleaning other adjacent grid zones of the same row one by one;

returning to the original point;

starting from the original point, moving forward linearly along the first direction; cleaning a second grid zone on another side along the first direction, and then cleaning other adjacent grid zones of the same row one by one;

returning to the original point;

starting from the original point, moving forward linearly along the second direction opposite to the first direction, cleaning a fourth grid zone which is on the same side and along the same column as the second grid zone, and then cleaning other adjacent grid zones of the same row one by one, wherein each of the grid zones is a rectangular zone having a predetermined length and a predetermined width; and the cleaning robot cleans each of the grid zones by following a zig-zag route having a curved bend at each turn.

4. The method of claim 2 or 3, wherein cleaning performed according to the zig-zag route with a curved bend at each turn comprises the following steps:

moving along a first direction on a first linear path up to a first turning point, turning from the first turning point and moving to a starting point of an adjacent second linear path along a curved path, moving along the second linear path along a second direction opposite to the first direction up to a second turning point, turning from the second turning point and moving to a starting point of an adjacent third linear path along a curved path, moving along the third linear path along the first direction up to a third turning point, turning from the third turning point and moving to a starting point of an adjacent fourth linear path along a curved path, moving along the fourth linear path along a second direction opposite to the first direction up to a fourth turning point, and so and so forth, wherein liner paths are parallel to each other and are spaced apart by a same interval of a predetermined width.

5. The method of claim 4, wherein turning along the curved path comprises the following steps:

obtaining a current angle value detected by a gyroscope of the cleaning robot;

calculating a difference in angle value between the current angle value and a targeted angle value;

calculating a projected variation of moving angle caused by an inner wheel and an outer wheel of the cleaning robot within a predetermined period of time in the future;

determining whether the projected variation of moving angle is smaller than the difference in angle value, if yes, maintaining the current variation of moving angle, if no, adjusting the current variation of moving angle such that when the cleaning robot reaches a starting point of an adjacent linear path, the cleaning robot moves on the linear path;

wherein an inner wheel refers to a drive wheel which moves slower when the cleaning robot makes a turn along the curved path; the outer wheel refers to a drive wheel which moves faster when the cleaning robot makes a turn along the curved path.

6. The method of claim 5, wherein the projected variation of moving angle caused by the inner wheel and the outer wheel of the cleaning robot within the predetermined period of time in the future is calculated according to the following steps:

obtaining a current moving speed of the inner wheel;

obtaining a current moving speed of the outer wheel;

calculating an absolute value of a difference in speed between the current moving speed of the inner wheel and the current moving speed of the outer wheel;

calculating a projected difference in moving distance between the inner wheel and the outer wheel within the predetermined period of time in the future, wherein said projected difference in moving distance is a product of the absolute value of the difference in speed times the predetermined period of time in the future;

calculating the projected variation of moving angle by dividing the projected difference in moving distance by a width between the inner wheel and the outer wheel.

7. The method of claim 5, wherein the current variation of moving angle is a ratio between the difference in moving distance between the inner wheel and the outer wheel to a width between the inner wheel and the outer wheel within a unit time, wherein the difference in moving distance between the inner wheel and the outer wheel is a product of the absolute value of difference in speed between the current moving speed of the inner wheel and the current moving speed of the outer wheel times the unit time.

8. The method of claim 5, wherein the current variation of moving angle is adjusted according to the following steps: obtaining a linear distance between a current point of position and a starting point along a widthwise direction of a linear path; calculating a distance ratio of the linear distance to a predetermined width; adjusting a moving speed of the inner wheel according to the distance ratio so that the moving speed of the inner wheel is equal to a current moving speed of the inner wheel times the distance ratio times a constant;

wherein the constant is obtained through tests and experiments.

9. The method of claim 1, wherein when obstructions are detected when cleaning the grid zones formed by the grids one by one, a method of handling the obstructions comprises the following steps:

using linear paths parallel to one another and longitudinally spaced apart from one another by predetermined width as linear paths on which the cleaning robot moves, wherein the cleaning robot moves towards opposite directions on each pair of adjacent linear paths;

using a point where the cleaning robot detects an obstruction on a current linear path on which the cleaning robot is moving as a current obstruction point;

using a starting point of a preceding linear path with respect to the current linear path on which the obstruction is detected as a reference starting point;

determining whether a projected point of the starting point of the preceding linear path projected vertically on the current linear path is behind the current obstruction point based on a moving direction of the current linear path;

if yes, the cleaning robot turns and moves along a next linear path, if no, determining whether a distance between the projected point and the current obstruction point is smaller than a predetermined distance for turning, if yes, the cleaning robot turns and moves along a next linear path, if no, the cleaning robot bypasses the obstruction.

10. The method of claim 9, wherein when an obstruction is detected during a turning of the cleaning robot, the cleaning robot directly moves along an edge of the obstruction; if a moving width has not yet exceeded a predetermined width after the cleaning robot has already bypassed the obstruction, the cleaning robot continues to move until it moves the predetermined width, and then continues to move along the linear path after turning; if the moving width has reached the predetermined width before the obstruction is bypassed, the cleaning robot will move along the linear path after turning when the predetermined width is reached.

11. The method of claim 1, wherein the step of cleaning the grid zones formed by the grids one by one comprises the following step:

starting from a zone cleaning starting point of a current grid zone, cleaning the current grid zone up to a zone cleaning finishing point of the current grid zone by following a zig-zag route having a curved bend at each turn;

determining cleaned areas and entry edges of uncleaned areas based on the map of grids showing the current grid zone;

configuring two entry reference paints at two end points of two ends of each of the entry edges respectively;

determining a most preferred entry point for the two entry reference points of each of the entry edges based on entry selection criteria;

determining the most preferred entry point of a particular entry edge as a cleaning starting point of a prioritized cleaning area based on cleaning prioritizing criteria;

moving from a current point of position to the cleaning starting point; cleaning the prioritized cleaning area according to predetermined cleaning criteria;

after cleaning the prioritized cleaning area, determining a next most preferred entry point as a cleaning starting paint of a next prioritized cleaning area according to entry selection criteria and cleaning prioritizing criteria, and so and so forth, until all uncleaned areas that satisfy cleaning criteria of uncleaned areas are cleaned;
then moving to a zone cleaning starting point of a next grid zone.

12. The method of claim 11, wherein the map of grids or the map of the entire region is a plane map constructed by the cleaning robot by recording its own moving paths while cleaning; construction of a plane map comprises the following steps:
marking all grids which the cleaning robot has moved on as cleaned units; marking all grids detected with an obstruction as obstruction units; marking all grids which the cleaning robot has not moved on as uncleaned units;
constructing the plane map based on the marked cleaned units, obstruction units and uncleaned units;
wherein, the map of the entire region is a plane map formed by all the maps of grids.

13. The method of claim 12, wherein said step of determining the most preferred entry point far the two entry reference points of each of the entry edges based on entry selection criteria comprises the following steps:
constructing an XY coordinate system using the current point of position as an origin of the coordinate system;
analyzing positions of the two entry reference points of a same entry edge in the coordinate system;
if the two reference points have the same value on the X axis, selecting the reference point that is nearest to the current point of position as the most preferred entry point;
if the two reference points have the same value on the Y axis, selecting the reference point that is nearest to the current point of position as the most preferred entry point;
if the two reference points do not have the same value on both the X axis and Y axis, determining a positional relationship between the uncleaned area and a cleaned area; if the uncleaned area is positioned on a left side of the cleaned area, selecting the entry reference point with a larger value on the X axis as the most preferred entry paint; if the uncleaned area is positioned on a right side of the cleaned area, selecting the entry reference point with a smaller value on the X axis as the most preferred entry point.

14. The method of claim 12, wherein said step of determining one of the most preferred entry points as the cleaning starting point of the prioritized cleaning area based on cleaning prioritizing criteria comprises the following steps:
selecting a most preferred entry point which is nearest to the current point of position in each uncleaned area as a prioritized cleaning reference point;
selecting two prioritized cleaning reference points which are nearest to the current point of position;
determining whether a difference in distance between the current point of position and the two prioritized cleaning reference points is smaller than a predetermined distance,
if yes, comparing the corresponding entry edges on which the prioritized cleaning reference points are positioned and selecting the prioritized cleaning reference point positioned on a longer one of the corresponding entry edges as the cleaning starting point;
if no, selecting the prioritized cleaning reference point which is nearest to the current point of position as the cleaning starting point.

15. The method of claim 12, wherein the step of cleaning the prioritized cleaning area according to predetermined cleaning criteria comprises the following steps:
determining a relationship between two end points of the entry edge on which the cleaning starting point is positioned;
if the two end points have the same value on X axis, moving the cleaning robot from the cleaning starting point directly towards another end point of the entry edge and cleaning the prioritized cleaning area by following the zig-zag route having a curved bend at each turn;
if the two end points have the same value on Y axis and if the prioritized cleaning area is situated above the entry edge, moving the cleaning robot along the positive direction of Y axis from the cleaning starting point and cleaning the prioritized cleaning area by following the zig-zag route having a curved bend at each turn; if the prioritized cleaning area is situated below the entry edge, moving the cleaning robot along the negative direction of Y axis from the cleaning starting point and cleaning the prioritized cleaning area by following the zig-zag route having a curved bend at each turn;
if the two end points have different values both on X axis and Y axis, moving the cleaning robot towards a direction perpendicular to the X axis of another end point, and cleaning the prioritized cleaning area by following the zig-zag route having a curved bend at each turn.

16. The method of claim 12, wherein determining whether the cleaning criteria of an uncleaned area are satisfied comprises the following step:
determining whether all entry edges of an uncleaned area have lengths all smaller than a predetermined entry length;
if yes, the uncleaned area of the entry edges concerned does not satisfy the cleaning criteria of the uncleaned area;
if no, the uncleaned area of the entry edges concerned satisfies the cleaning criteria of the uncleaned area.

17. The method of claim 12, wherein moving from the current point of position to the cleaning starting point comprises the following steps:
searching the map of grids, treating a path disposed with predetermined moving points from the current point of position to the cleaning starting point as a predetermined moving path;
treating a grid on which the current point of position is situated as a current grid, and treating a next grid along the a direction of the predetermined moving path as a path reference grid;
determining whether grids within a predetermined distance at any one side of the path reference grid perpendicular to the predetermined moving path are obstruction units,
if no, treating the predetermined moving point corresponding to the path reference grid as a moving point,
if yes, determining whether grids within a predetermined distance at another side of the path reference grid are obstruction units,
if yes, treating the predetermined moving point corresponding to the path reference grid as a moving point,
if no, treating a point deviated from the predetermined moving point corresponding to the path reference grid by a set distance towards a direction away from the obstruction unit as a moving point;

after that, treating a next next grid as the path reference grid and repeating subsequent processing steps described above, and so and so forth, until the last grid subject to the above described processing steps is a grid where the cleaning starting point is positioned, and then the above described processing ends;

treating a path disposed with moving points determined according to the above processing steps from the current point of position to the cleaning starting point as the moving path.

18. The method of claim 17, wherein moving from the current point of position to the cleaning starting point also comprises the following steps:

if a grid within a predetermined distance in front of a path reference grid is an obstruction unit, determining whether grids within a predetermined distance at any one side along a direction perpendicular to the predetermined moving path are obstruction units, if yes, treating a paint deviated from the predetermined moving point corresponding to the path reference grid by a set distance towards a first predetermined direction as a moving point, wherein the first predetermined direction is an integrated direction that integrates a direction deviated from obstructions at the sides and a direction deviated from obstructions at the front;

if no, treating a point deviated from the predetermined moving point corresponding to the current grid by a set distance towards a second predetermined direction as a moving point, wherein the second predetermined direction is an integrated direction that integrates a direction from the path reference grid to a next grid along a direction of the predetermined moving path and a direction deviated from the obstruction unit at the front.

19. The method of claim 17, wherein a coordinate of a predetermined moving point is determined according to the following steps:

treating a coordinate of any grid along the moving path as (X,Y), treating a length of any grid being h, and a width being w;

treating a coordinate of any predetermined moving point as (x,y), then x=X*h+h/2, and y*w+w/2.

20. The method of claim 19, wherein after treating a path disposed with moving point from the current point of position to the cleaning starting point as the moving path, further comprising the following steps:

determining a current moving point, a next moving point, and a next next moving point based on the moving path;

treating a direction from the current moving point to the next moving point as a current direction;

treating a direction from the next moving point to the next next moving point as a changeable direction:

when the cleaning robot moves from the current moving point by a predetermined distance towards the next moving point, determining whether the changeable direction is the same as the current direction, if yes, maintaining the current direction and a current speed to continue moving, if no, adjusting the current direction and the current speed so that the cleaning robot follows a curved path when moving from a point reached after having moved from the current moving point by the predetermined distance to the next next moving point;

the steps above repeat until the next next moving point is the cleaning starting point;

considering an adjusted moving path as the most preferred moving route.

21. The method of claim 20, wherein said step of adjusting the current direction and the current speed so that the cleaning robot follows a curved path when moving from a point reached after having moved from the current moving point by the predetermined distance to the next next moving point comprises the following steps:

predicting a projected moving distance in a next period of moving based on the current speed;

determining whether the projected moving distance is greater than a remaining distance between the next moving point and a point reached by the cleaning robot after having moved from the current point of position towards the next moving point by the predetermined distance;

if no, continuing to move according to the current speed;

if yes, reducing the current speed and adjusting a difference in speed between the inner wheel and the outer wheel so that the moving direction of the cleaning robot changes gradually from the current direction to a direction consistent with the changeable direction.

22. The method of claim 21, wherein said step of adjusting the difference in speed between the inner wheel and the outer wheel so that the moving direction of the cleaning robot changes gradually from the current direction to the direction consistent with the changeable direction comprises the following steps:

determining whether an angle between the changeable direction and the current direction is smaller or equal to 45 degrees, if yes, configuring a speed of the inner wheel being one fourth of a speed of the outer wheel;

if no, configuring the speed of the inner wheel being one sixth of the speed of the outer wheel;

calculating a projected difference in moving distance between the inner wheel and the outer wheel within a predetermined period of time in the future, wherein said projected difference in moving distance is a product of an absolute value of the difference in speed between the inner wheel and the outer wheel times the predetermined period of time in the future;

calculating a projected variation of moving angle by dividing the projected difference in moving distance by a width between the inner wheel and the outer wheel;

determining whether a difference between the current direction and the changeable direction is smaller than the projected variation of moving angle, if no, maintaining the current speed of the outer wheel and the inner wheel, if yes, adjusting the speed of the outer wheel or the speed of the inner wheel so that the speed of two wheels are the same.

23. The method of claim 1, wherein cleaning peripheral areas of the entire based on the map of the entire region comprises the following steps:

by reference to the map of the entire region, determining the nearest peripheral paint of the map of the entire region from a current point of position as a periphery starting point;

moving the cleaning robot from the current paint of position to the periphery staring point and starting to clean along the periphery;

by reference to the periphery staring point, determining whether a distance the cleaning robot has moved is greater than a perimeter of the peripheries of the map of the entire region, determining whether the cleaning robot has rotated more than 360 degrees, and determining whether the cleaning robot is positioned within a predetermined range from the periphery staring point;

if any one of the above is no, continuing to clean along the periphery;

if all of the above are yes, ending the cleaning along the periphery of the entire region as the cleaning is completed.

24. The method of claim 23, wherein in the of leaning the peripheral areas of the entire region, if there are consecutively grids detected as uncleaned grids, it is determined that a new area exists, and the new area will be cleaned first according to a zig-zag route having a curved bend at each turn; after the new area has been cleaned, the cleaning robot continues to clean the peripheral areas of the entire region.

25. A chip, which stores procedures for controlling the cleaning robot o implement he method of planning a cleaning route as recited in claim 1.

* * * * *